(12) United States Patent  (10) Patent No.: US 7,643,196 B2
Bernstein et al.  (45) Date of Patent: Jan. 5, 2010

(54) SYSTEMS, METHODS AND DEVICES FOR ACTUATING A MOVEABLE MINIATURE PLATFORM

(75) Inventors: Jonathan Bernstein, Medfield, MA (US); Fran J. Rogomentich, Wilmington, MA (US); Tommy Lee, Wilmington, MA (US); Mathew Varghese, Arlington, MA (US); Gregory A. Kirkos, Seattle, WA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 666 days.

(21) Appl. No.: 11/305,053

(22) Filed: Dec. 16, 2005

(65) Prior Publication Data

US 2007/0139752 A1  Jun. 21, 2007

(51) Int. Cl.
*G02B 26/08* (2006.01)
(52) U.S. Cl. ................ 359/224.1; 359/200.7; 310/40 R
(58) Field of Classification Search ........................ None
See application file for complete search history.

(56) References Cited

U.S. PATENT DOCUMENTS

| | | | |
|---|---|---|---|
| 3,642,353 A | 2/1972 | Field | |
| 3,946,166 A | 3/1976 | Wossidlo | |
| 4,073,567 A | 2/1978 | Lakerveld et al. | |
| 4,100,576 A | 7/1978 | Ditthardt | |
| 4,151,757 A | 5/1979 | Pitrat et al. | |
| 4,157,861 A | 6/1979 | Davies | |
| 4,175,832 A | 11/1979 | Umeki et al. | |
| 4,269,486 A | 5/1981 | Shintani et al. | |
| 4,376,572 A | 3/1983 | Gijzen | |
| 4,613,203 A | 9/1986 | Proetel et al. | |
| 4,714,214 A | 12/1987 | Schleimann-Jensen et al. | |
| 5,239,361 A | 8/1993 | Burch | |
| 5,668,655 A | 9/1997 | Schweizer et al. | |
| 5,754,327 A | 5/1998 | Masotti et al. | |
| 6,028,689 A | 2/2000 | Michalicek et al. | |
| 6,072,686 A | 6/2000 | Yarbrough | |
| 6,388,789 B1 | 5/2002 | Bernstein | |
| 6,428,173 B1 | 8/2002 | Dhuler et al. | |
| 6,522,452 B2 | 2/2003 | Wood | |
| 6,720,682 B2 | 4/2004 | Hatam-Tabrizi et al. | |
| 6,729,545 B2 | 5/2004 | Li et al. | |
| 6,760,145 B1 | 7/2004 | Taylor et al. | |

(Continued)

FOREIGN PATENT DOCUMENTS

DE    3424230    3/1986

(Continued)

OTHER PUBLICATIONS

Ankur Jain, et al., "A Two-Axis Electrothermal Micromirror for Endoscopic Optical Coherence Tomography" IEEE Journal of Selected Topics in Quantum Electronics, vol. 10, No. 3, (May-Jun. 2004).

(Continued)

*Primary Examiner*—James Phan
(74) *Attorney, Agent, or Firm*—Goodwin Procter LLP

(57) ABSTRACT

Presented herein are systems, methods and devices relating to miniature actuatable platform systems. According to one embodiment, the systems, methods, and devices relate to controllably actuated miniature platform assemblies including a miniature mirror.

5 Claims, 14 Drawing Sheets

U.S. PATENT DOCUMENTS

| | | | |
|---|---|---|---|
| 6,778,728 B2 | 8/2004 | Taylor et al. | |
| 6,828,698 B2 | 12/2004 | Hatam-Tabrizi et al. | |
| 6,844,952 B2 | 1/2005 | Dalziel | |
| 6,894,823 B2 | 5/2005 | Taylor et al. | |
| 6,914,361 B2 | 7/2005 | Beyer et al. | |
| 7,019,877 B2 | 3/2006 | Shpizel et al. | |
| 2002/0075554 A1 | 6/2002 | Brophy et al. | |
| 2002/0158547 A1 | 10/2002 | Wood | |
| 2002/0167309 A1 | 11/2002 | Chaparala | |
| 2005/0018322 A1 | 1/2005 | Ben-Gad et al. | |
| 2005/0078346 A1 | 4/2005 | Turner et al. | |
| 2005/0122604 A1* | 6/2005 | Kamiya et al. | 359/872 |

FOREIGN PATENT DOCUMENTS

| | | |
|---|---|---|
| EP | 899598 | 3/1999 |
| EP | 977066 | 2/2000 |
| EP | 1031867 | 8/2000 |
| JP | 2003090970 | 3/2003 |
| WO | WO-0148527 | 7/2001 |

OTHER PUBLICATIONS

Tuqiang Xie, et al., "Endoscopic Optical Coherence Tomography with New MEMS Mirror" Electronics Letters: Oct. 16, 2003 vol. 39 No. 21.

Invitation to Pay Additional Fees and Partial International Search Report for corresponding Int'l. Application No. PCT/US2006/047960, mailed Jun. 18, 2007 (4 pages).

International Search Report for corresponding Int'l. Application No. PCT/US2006/047960, mailed Aug. 27, 2007 (6 pages).

Written Opinion for corresponding Int'l. Application No. PCT/US2006/047960, mailed Aug. 27, 2007 (8 pages).

* cited by examiner

SYSTEMS, METHODS AND DEVICES FOR ACTUATING A MOVEABLE MINIATURE PLATFORM

FIELD OF THE INVENTION

The invention generally relates to controllably actuatable miniature platforms, and more specifically, in various embodiments, to systems, methods and devices relating to controllably actuated miniature platform assemblies including a miniature mirror.

BACKGROUND

Scanning optical beam technologies, such as bar-code readers, cameras, projection TVs, endoscopes, and laparoscopes, often employ miniature electrical-mechanical mirrors, such as micro-electrical-mechanical (MEMS) mirrors, to direct the optical beam. MEMS mirrors typically use high-voltage electrostatic, electrothermal, piezoelectric, or electromagnetic actuation, which all typically require electrical wires attached to the mirror. These wires can block the optical beam, precluding certain optical designs. Additionally, high voltages are considered unsafe and unreliable for certain applications, such as medical devices.

A conventional alternative for medical scanning devices employs an optical fiber to bring in the light and collect the return signal. Theses devices typically rotate the optical fiber within the device to obtain a scanned image. One current approach for creating a circular scan about a rotation axis employs a rotating mechanical linkage driven by an external motor to rotate the optical fiber. This approach suffers from several drawbacks. One drawback is that the rotating mechanical linkage typically requires an expensive component known as an optical rotary connector. Another drawback is that, for narrow bore (<2 mm) scanning instruments, the stiffness of the mechanical train of the instrument is insufficient to ensure uniform rotation of the optical fiber. Non-uniform rotation of the optical fiber leads to distortion of the image, known as Non-Uniform Rotation Distortion (NURD). A further drawback is that this approach produces a single axis scan.

Accordingly, improved approaches for providing miniature optical scanning devices is needed.

SUMMARY OF THE INVENTION

The invention addresses the deficiencies in the prior art by, in various embodiments, providing improved systems, methods and devices relating to controllably actuating a miniature platform along multiple axes. According to some embodiments, miniature mirrors may be mounted on, formed on, formed integrally with, or formed from such platforms. According to some configurations, the platforms of the invention may also be rotationally actuatable. According to one advantage, the miniature actuatable platforms of the invention employ a magnetic drive, which uses low voltages (typically less than about 2 volts) and requires no electrical wires to be attached to the platform. According to another advantage, mechanical rotation of an optical fiber is no longer necessary, as the optical fiber can remain stationary while the platform, with a reflective surface, is moved.

According to one aspect, the invention provides a miniature actuatably movable support structure, including a platform, a support element, and a magnetic bearing. Generally, the magnetic bearing is disposed between the platform and the support element to provide a magnetically enhanced pivot interface between the support element and the platform. The platform, in some configurations, is shaped as a cylindrical disk having first and second opposed, substantially circular surfaces. Alternatively, the platform and the first and second surfaces may have any suitable shape. According to one configuration, the platform has an outside diameter of between about 0.3 mm and about 5 cm, with a height/thickness of between about 0.02 mm and about 5 mm. In various other configurations, the movable platform has a diameter/width of less than about 5 cm, about 2.5 cm, 1 cm, 500 mm, 250 mm, 100 mm, 50 mm, 10 mm, 1 mm, 0.5 mm, 0.3 mm, or 0.1 mm. According to further configurations, the movable platform has a thickness/height of less than about 5 mm, 2.5 mm, 1 mm, 0.5 mm, 0.25 mm, 0.1 mm, 50 μm, 25 μm, 10 μm, or 5 μm.

The platform may include a cavity formed into the first (e.g., under) surface of the platform. The cavity includes an inner surface, which contacts the magnetic bearing. The cavity may be any suitable geometrical shape, including, without limitation, hemispherical, rectangular, conical or v-shape. Additionally, the cavity may be centrally located, or may be elongated and extend along a portion of or the entire diameter/width of the platform. Alternatively, the platform may be designed without any cavity.

According to one feature, the inner surface of the cavity is substantially smooth. According to another feature, the inner surface of the cavity is formed from a ferromagnetic material, or is magnetized with a polarity opposite to that of the magnetic bearing, so that the magnetic bearing and the inner surface of the cavity attract each other. According to one configuration, the entire or substantially entire platform is formed from a hard magnetic or ferromagnetic material. However, according to another configuration, the platform is formed from non-magnetically attractive material, with one or more magnets attached to or formed into the platform.

According to one feature, the magnetic attraction between the platform and the bearing maintains contact between the surface of the cavity and the magnetic bearing regardless of the pivoted and/or rotated orientation of the platform relative to the support element. As a result of this feature, the combined structure of the platform, magnetic bearing and support element may be rotated and moved into any desirable orientation relative to a three-dimensional space, without losing contact between the platform and the bearing. According to further feature, the magnetic interaction between the platform and the magnetic bearing creates a spring restoring force which acts to center the platform on the bearing of the support element.

According to another feature, the second (e.g., upper) surface of the platform is or includes a portion that is reflective. Alternatively, the second surface may include a reflective coating, or a reflective component may be mounted to the second surface. In once configuration, the second surface is substantially flat. However, in other configurations, it may be any suitable shape, including, without limitation, convex, concave, faceted, or including any combination of flat, convex, concave, and/or faceted portions.

According to one embodiment, the support element is non-magnetic, conically shaped, and has a height of between about 0.1 mm and about 100 mm. However, in alternative embodiments, the support element may have any suitable shape. According to one feature, the support element includes a concave cradle-like receptacle at one end for receiving a magnetic bearing. The magnetic bearing may be rotatable within the receptacle, or it may be positionally fixed within the receptacle. According to other configurations, the magnetic bearing may be any suitable geometrical shape, including, without limitation, spherical, hemispherical, or conical. Also, the magnetic bearing may be relatively soft or hard, or include a relatively soft or hard outer shell. Additionally, the end of the support element may include no receptacle, and instead contain a magnetic material and suitably shaped to attract and contact the first surface of the platform. By way of example, the end may be conically shaped having a blunt or sharp tip.

In operation, the magnetic bearing or the tip of the support element acts as a pivot, about which the platform is free to tilt in any direction. In some embodiments, the platform may also rotate, for example, about a longitudinal axis of the support element. According to one feature, the dimensions and shape of the cavity in the platform, along with the width of the support element near the platform determine a maximum angle of available deflection between the platform and the support element.

In a further aspect, the invention includes a magnetic platform actuator. According to one embodiment, the magnetic platform actuator includes four coils and a base. However, the magnetic platform actuator may include any desirable number of coils. According to one implementation, the coils are driven in a controlled manner to tilt the platform. More specifically, providing current to a particular coil creates a magnetic field, which attracts the platform to cause the platform to tilt toward or away from the particular coil. More generally, by providing current to individual coils or combinations of coils, the platform is made to tilt in the desired direction. For example, the coils may be operated in pairs to provide a push-pull torque. According to one embodiment, the platform has a reflective surface, and by regulating the current drive to the coils, the reflective surface may be controllably positioned, for example, for optical beam steering, imaging or other applications.

According to a further embodiment, the current drive may sweep the coils sequentially causing the platform to sequentially tilt toward each successive coil to create a circular scanning motion. Additionally, by varying the intensity of the current for each successive sweep of the coils, successive raster scans of any desirable size may be achieved. Also, by varying the intensity of the current during a scan, a scan of any desirable shape may be achieved.

According to one configuration, the magnetic platform actuator is positioned near the mirror side of the platform. However, according to an alternative configuration, the magnetic actuator may be positioned in any suitable location. According to one configuration, the coils are positioned parallel to one another, evenly spaced along the periphery of the base of the magnetic platform actuator, but in alternative configurations, the coils may be positioned in any suitable arrangement on or relative to the base. Additionally, the coils may be swept in any desirable pattern, or in a random or substantially random pattern, depending on the application.

According to another aspect, the invention provides a miniature gimbaled platform assembly, including a platform, a support structure, a gimbal, and a magnet. According to this aspect, rather than having a single gimbal plate, the gimbal of this assembly includes first, second, and third plates, configured as concentric toroids, with the first plate being the innermost toroid, the second plate being next, followed by the outermost third plate.

According to one feature, the miniature gimbaled platform assembly includes two pairs of rotational flexures. The first pair of flexures extend generally along a first axis (e.g. an x-axis) and rotatably interconnect the innermost plate of the gimbal to the middle plate of the gimbal. Similarly, the second pair of rotational flexures extend generally along a second axis (e.g., a y-axis) perpendicular to the first axis and rotatably interconnect the middle plate of the gimbal to the outermost plate of the gimbal. The first pair of flexures are sized and shaped to permit the middle plate to rotate about the x-axis relative to the innermost plate. The second pair of flexures are sized and shaped to permit the middle and outermost plates to rotate about the y-axis relative to each other.

According to one feature, the rotational flexures have a width of between about 1 µm and about 10 µm and a thickness/depth of about 10 µm to about 100 to permit such relative movements. In one configuration, the width of the flexures is about 6 µm and the thickness/depth of the flexures is about 50 µm. According to another feature, the rotational flexures have a resonant frequency of about 250 Hz to about 750 Hz. In one implementation, the rotational flexures have a resonant frequency of about 500 Hz. According to a further feature, the plates have a thickness of between about 100 µm and about 750 µm. In another configuration, the plates have a thickness of about 400 µm. In one configuration, the inner, middle, and outer plates along with both sets of flexures are formed monolithically from silicon. According to one configuration, the outermost plate of the gimbal has an outside diameter of between about 500 µm and about 2 mm.

According to one embodiment, the support structure of this aspect of the invention includes a base, a transition portion, and a support post. The transition portion extends axially out of a central location in the base and has a diameter that tapers smaller as the transition portion extends away from the base. The support post extends axially out of the transition portion, which provides increased structural support for the support post. The support post includes first and second sections. The second section of the support post has a reduced diameter relative to the first section forming a radially extending shoulder at a transition between the first and second sections.

According to a further embodiment, the innermost gimbal plate has a centrally located through aperture, which slidably interfits over the reduced diameter section of the support post causing the plate to abut and rest on the shoulder of the support. A cap interfits over the reduced diameter section of the support post locking the gimbal onto the support post. According to some embodiments, the gimbal is rotatable about the reduced diameter section of the support post. In other embodiments, the gimbal is rotationally fixed with respect to the reduced diameter section.

According to one embodiment, the magnet of this aspect of the invention is also toroid shaped, and includes an inner wall having a radially inward extending shoulder. The magnet mounts over the gimbal such that the shoulder abuts and is supported by an outer periphery of the outermost gimbal plate. According to one configuration, the wall extends axially past the outermost gimbal plate toward the support base.

According to a further embodiment, the platform of the miniature gimbaled platform assembly has a substantially cylindrical disk shape with opposed substantially circular first (e.g., top) and second (e.g., bottom) surfaces. According to one configuration, the second surface of the platform mounts on top of the toroidal magnet. The platform has an outside diameter of between about 0.3 mm and about 5 cm, with a height of between about 0.3 mm and about 5 cm. In various other configurations, the movable platform has a diameter/width of less than about 5 cm, about 2.5 cm, 1 cm, 500 mm, 250 mm, 100 mm, 50 mm, 10 mm, 1 mm, 0.5 mm, 0.3 mm, or 0.1 mm. According to further configurations, the platform has a height of less than about 5 cm, about 2.5 cm, 1 cm, 500 mm, 250 mm, 100 mm, 50 mm, 10 mm, 1 mm, 0.5 mm, 0.3 mm, or 0.1 mm. According to one feature, although the platform surfaces are shown as being substantially circular, they may have any suitable geometrical shape, including, without limitation, having any suitable polygonal or ovular shape.

According to another feature, the first (e.g., top) surface of the platform is or includes a portion that is reflective. Alternatively, the surface may include a reflective coating or other treatment. Additionally, the surface may be substantially flat, or it may be any suitable shape, including, without limitation, convex, concave, and faceted, or including any suitable combination of flat, convex, concave, and faceted portions. In alternative configurations, rather than employing a magnet mounted on the gimbal, the assembly includes magnets mounted over the gimbal, for example, on the bottom surface of the platform. Alternatively, a magnetic coating may be applied to the bottom side of the platform, or this surface may be formed from a magnetically charged material.

According to one feature, the platform of the miniature gimbaled assembly is controllably movable in three dimensional space about x- and y-axes. Additionally, the platform may rotate about the z-axis. The gimbaled platform assembly may be actuated by employing a magnetic platform actuator, similar to the magnetic platform actuator described above.

According to another aspect, the invention provides a miniature actuatably moveable gimbaled platform assembly having a platform that is moveable relative to a stationary outer frame, rather than relative to a centrally located support post. According to this aspect, the gimbaled platform assembly includes a platform, an outer frame, at least one pair of rotational flexures, and a support structure.

According to one configuration, the platform is suspended via a pair of rotational flexures within the frame. According to one embodiment, the rotational flexures are diametrically aligned on opposite sides of the platform and frame. In one embodiment, the platform rotates about the rotational flexures, while the frame remains stationary. However, in other embodiments, the frame may also be rotationally coupled to a further support structure. In one configuration, the frame rotates relative to the support structure along an axis perpendicular to the axis of rotation of the platform relative to the frame.

According to one embodiment, the assembly includes two spindles attached to or formed integrally with the frame. In one configuration, the spindles interfit with receptacles on the support structure to enable the frame to rotate relative to the support structure. According to an alternative configuration, the spindles are located on the support structure and the receptacles are located on the frame. According to another embodiment, rather than spindles and receptacles, a second pair of flexures may be used to rotationally couple the frame and the support structure.

According to a further embodiment, the assembly includes a magnet, attached to the platform. The magnet may be substantially flat, or it may be any suitable shape. Additionally, the magnet may cover only a portion of a surface of the platform, or it may cover the entire surface of the platform. According to an alternative embodiment, the assembly may include a plurality of magnets attached to the surface of the platform. According to a further embodiment, the platform may also include a reflective component.

According to a further aspect, the invention provides a platform position sensing system for providing feedback regarding the tilt of any of the above described platforms. The platform position sensing system includes a magnetic sensor. According to one implementation, the magnetic sensor is a Hall effect sensor capable of measuring two axes of tilt of a platform, based on the magnetic field. As the platform rotates about x- and y-axes, the Hall effect sensor measures the axes of tilt of the platform. According to one embodiment, the magnetic sensor is a 2-axis magnetic sensor, while according to an alternative embodiment, the magnetic sensor is a 3-axis magnetic sensor.

According to one implementation, the position sensing system converts target points for a raster scan to corresponding tilt angles for the platform. Tilt angle control circuitry provides corresponding commands to drive circuits, which in turn provide corresponding drive currents to the platform positioning coils. Altering the drive current adjusts the magnetic field of the positioning coils to provide the desired platform tilt. The Hall effect sensor senses the resulting magnetic field created by the tilted platform, and determines actual platform tilt. This information is fed back to the tilt angle control circuitry, which then readjusts the commands to the drive circuits.

Additional aspects, embodiments, configurations and features of the invention are described below with respect to various illustrative embodiments and reference to the appended drawings.

DESCRIPTION OF THE ILLUSTRATED EMBODIMENTS

To provide an overall understanding of the invention, certain illustrative embodiments will now be described, including systems, methods and devices for providing improved controllably actuatable miniature platforms.

Figure 1:
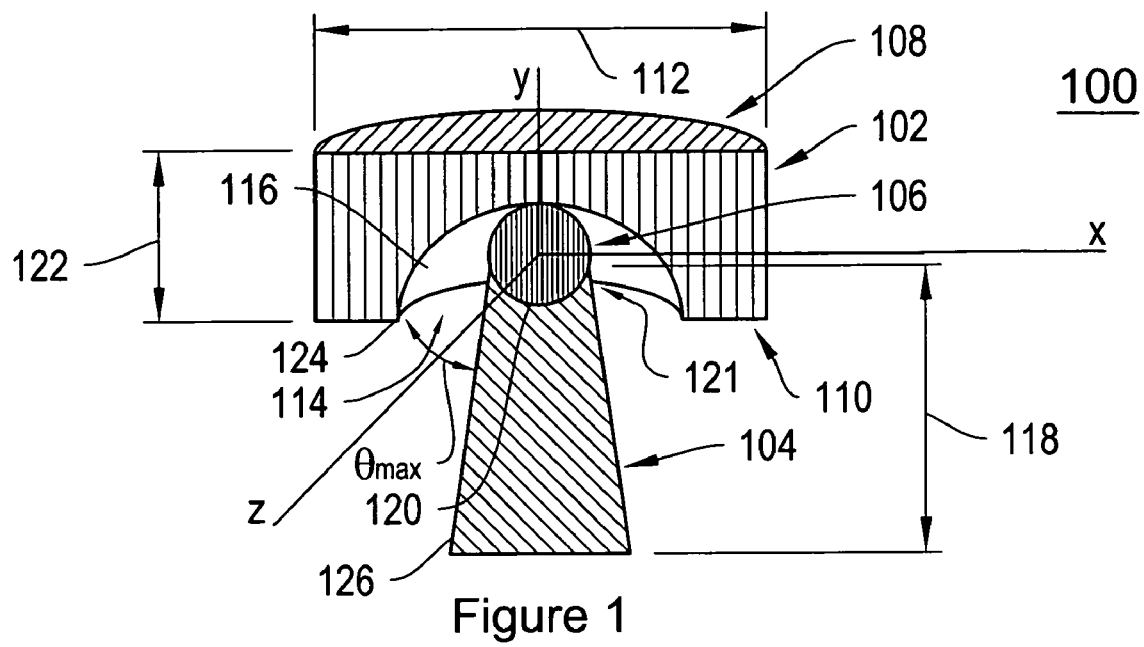
FIG. 1 is a cross-sectional view of a support structure having a magnetically assisted pivot interface with a hemispherical platform cavity according to an illustrative embodiment of the invention.

FIG. 1 shows a cross-sectional view of a miniature support structure 100, according to an illustrative embodiment of the invention. The miniature support structure 100 may be employed in a variety of applications, including as described below in further detail with respect to FIG. 4, a miniature controllably actuated mirror system. The mirror support structure 100 includes a platform 102, a support element 104, and a spherical magnetic bearing 106. Generally, according to the illustrative embodiment, the magnetic bearing 106 is disposed between the platform 102 and the support element 104 to provide a magnetically enhanced pivot between the support element 104 and the platform 102.

According to the illustrative embodiment, the platform 102 has a substantially cylindrical disk shape with opposed substantially circular surfaces 108 and 110. The platform 102 has an outside diameter 112 of between about 0.3 mm and about 5 cm, and a height/thickness 122 of between about 0.01 mm and about 1 cm. In various other configurations, the movable platform has a diameter/width of less than about 5 cm, about 2.5 cm, 1 cm, 500 mm, 250 mm, 100 mm, 50 mm, 10 mm, 1 mm, 0.5 mm, 0.3 mm, or 0.1 mm. According to further illustrative configurations, the platform has a height/thickness of less than about 1 cm, 500 mm, 250 mm, 100 mm, 50 mm, 10 mm, 1 mm, 0.5 mm, 0.3 mm, 0.1 mm, 0.05 mm, 0.025 mm, or 0.01 mm.

The platform 102 includes a hemispherical cavity 114 formed into the surface 110. The cavity 114 includes an inner surface 116, which movably contacts the magnetic bearing 106. Although the surfaces 108 and 110 are shown as being substantially circular, they may have any suitable geometrical shape, including, without limitation, any suitable polygonal or ovular shape. Further, although the cavity 114 is depicted as being substantially hemispherical, it too may have any suitable geometrical shape, including, without limitation, rectangular, conical or v-shape. Additionally, the cavity 114 may be centrally located, or may be elongated and extend along a portion of or the entire diameter/width of the platform 102. Alternatively, the platform 102 may be designed without any cavity 114.

The inner surface 116 of the cavity 114 is substantially smooth, and according to the illustrative embodiment, formed from a ferromagnetic material, or in some cases, is magnetized with opposite polarity to that of the magnetic bearing 106, so that the bearing 106 and the inner surface 116 attract each other. As described in further detail below with regard to FIG. 4, the surface 108 of the platform 102 may be or include a portion that is reflective. Alternatively, the surface 108 may include a reflective coating or a reflective component may be mounted to the surface 108. Although the surface 108 is shown as being substantially flat, it may be any suitable shape, including, without limitation, convex, concave, faceted, or including any combination of flat, convex, concave, and/or faceted portions.

According to the illustrative embodiment, the support element 104 is non-magnetic, conically shaped, and has a height 118 of between about 0.2 mm and about 1 cm. However, in alternative illustrative embodiments, the support element 104 may have any suitable shape. One feature of the support element 104 is that it includes a concave, cradle-like receptacle 120 at the end 121 for receiving the magnetic bearing 106. According to some illustrative embodiments, the magnetic bearing 106 is rotatable within the receptacle 120. In other illustrative embodiments, the magnetic bearing 106 is positionally fixed within the receptacle. Although the magnetic bearing 106 is depicted as being substantially spherical, it may be any suitable geometrical shape, including, without limitation, hemispherical, conical, cylindrical, or knife-edged. The magnetic bearing 106 may comprise a soft magnetic material such as Permalloy, CoFe, or Alloy 1010 steel, or it may comprise a hard magnetic material, such as SmCo, NdFeB, AlNiCo, or a Ferrite. In other illustrative embodiments, the end 121 may include no receptacle, and instead be magnetically charged and suitably shaped to attract and movably contact the surface 116. By way of example, the end 121 may be conically shaped having a relatively blunt or sharp tip.

The platform 102 is depicted as resting on top of the magnetic bearing 106 and the support element 104. The magnetic bearing 106 acts as a pivot, about which the platform 102 is free to tilt in any direction. According to further illustrative embodiments, the platform 102 may also rotate about the longitudinal axis of the support element 104 (i.e. the y-axis).

As mentioned above, the inner surface 116 of the cavity 114 may be magnetically poled. In some illustrative embodiments, the entirety or substantial entirety of the platform 102 may be formed from a magnetized material. However, in other illustrative embodiments, the platform 102 may not be magnetic, or may be formed from non-magnetically attractive material, with one or more magnets attached to or formed into the platform 102.

According to one illustrative embodiment, the platform 102 and the magnetic bearing 106 are both constructed as magnets, and formed, for example, of NdFeB, SmCo, Ferrite, Pt—Co, AlNiCo, or any other suitable hard magnetic material. The support element 104 is non-magnetic, and may be constructed, for example, of titanium, aluminum, brass, bronze, plastic, or any other suitable non-magnetic material.

In operation (and as described in further detail with respect to FIG. 4), the platform 102 is controllably pivotable in three dimensional space about the location at which the magnetic bearing 106 contacts the inner surface 116 of the cavity 114. The magnetic bearing 106 magnetically attracts the platform 102 to maintain contact between the hemispherical surface 116 and the magnetic bearing 106, regardless of the pivoted and/or rotated orientation of the platform 102 relative to the support element 104. According to one illustrative embodiment, the platform 102 and the bearing 106 both contain permanent magnets, and the magnetic interaction between the platform 102 and the bearing 106 creates a magnetic spring restoring force which acts to center the platform 102 on the bearing 106 of the support element 104.

According to one feature, the cavity 114 has a peripheral edge 124, and the support element 104 has an outer surface 126. The distance between the peripheral edge 124 of the cavity 114 and the outer surface 126 of the support element 104, when the platform 102 is normal to the y-axis (i.e., the longitudinal axis of the support element 104), defines the maximum angle of platform tilt, $\theta_{max}$. $\theta_{max}$ may be adjusted by employing different cavity 114 and/or support element 104 geometries. For example, the width of the support structure 104 may be narrowed and/or the width/diameter of the cavity 114 may be enlarged to increase $\theta_{max}$.

According to one feature, the combined structure 100 of the platform 102, the magnetic bearing 106, and the support element 104 may be rotated and moved to any desirable orientation relative to a three-dimensional space, since the magnetic attraction between the bearing 106 and the platform 102 maintains the contact between the magnetic bearing 106 and the platform 102, regardless of the orientation of the overall structure 100.

Figure 2:
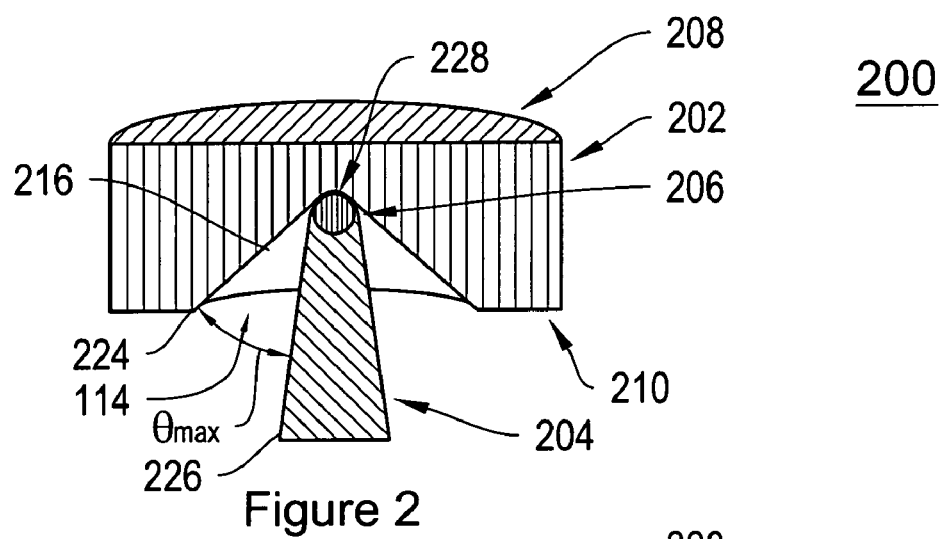
FIG. 2 is a cross-sectional view of a support structure similar to the embodiment of FIG. 1, but having a conical platform cavity according to an alternative illustrative embodiment of the invention.

FIG. 2 is a cross-sectional view of a miniature support structure 200 similar to the support structure 100 of FIG. 1, but having a conical platform cavity 214 according to an another illustrative embodiment of the invention. The miniature support structure 200 may be employed in a variety of applications, including as described below in further detail with respect to FIG. 4, a miniature controllably actuated mirror system. The miniature support structure 200 includes a platform 202, a support element 204, and a spherical magnetic bearing 206. According to the illustrative embodiment, the platform 202 has a substantially cylindrical disk shape with opposed surfaces 208 and 210. The surface 208 is substantially circular, while the surface 210 is substantially annular. The platform 202 is similar to the platform 102 of FIG. 1. However, the platform 202 includes a conical cavity 214, formed into the surface 210. The cavity 214 includes an inner surface 216, which movably contacts the magnetic bearing 206. The inner surface 216 is similar to the inner surface 116 of FIG. 1. Additionally, the support element 204 and the magnetic bearing 206 are similar to the support element 104 and the magnetic bearing 106 of FIG. 1. Similar to the structure 100 of FIG. 1, the magnetic bearing 206 acts as a pivot, about which the platform 202 is free to tilt in any direction.

As in the case of the cavity 114, the cavity 214 has a peripheral edge 224, and the support element 204 has an outer surface 226. The distance between the peripheral edge 224 of the cavity 214 and the outer surface 226 of the support element 204 defines the maximum angle of platform tilt, $\theta_{max}$. $\theta_{max}$ may be adjusted by altering the size of the cavity 214 or by employing various geometries of the cavity 214 and/or the support element 204. One advantage of the illustrative embodiment of FIG. 2 is that movement of the magnetic bearing 206 within an apex 228 of the conical cavity 214 is more restricted than is the movement of the bearing 106 along the inner surface 116 of the hemispherical cavity 114. This feature provides additional stability to the structure 200.

Figure 3:
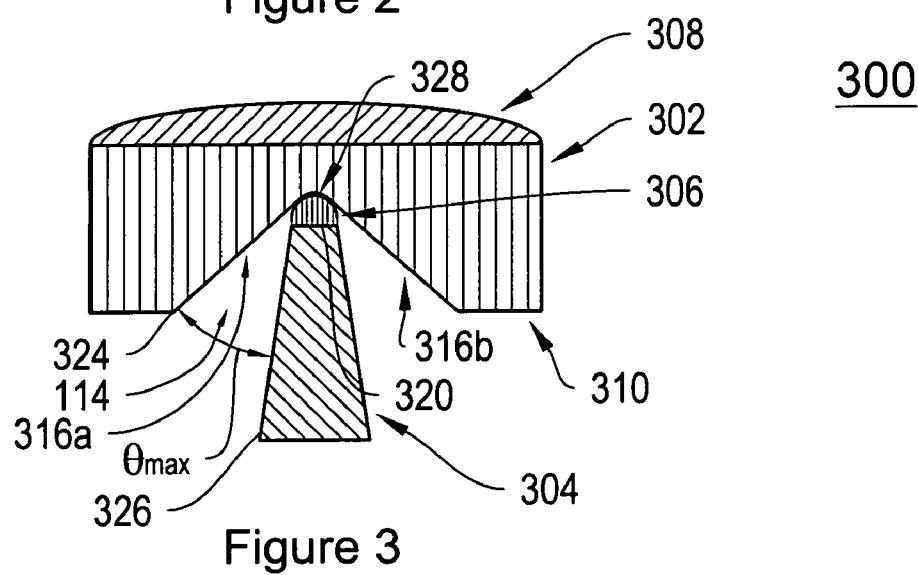
FIG. 3 is a cross-sectional view of a support structure similar to the embodiment of FIG. 1, but having a V-shaped platform cavity according to another illustrative embodiment of the invention.

FIG. 3 is a cross-sectional view of a support structure 300 similar to the embodiment 200 of FIG. 2, but having a V-shaped platform cavity 314 and a knife-edge magnetic bearing 306 according to another illustrative embodiment of the invention. The miniature support structure 300 may be employed in a variety of applications, including as described below in further detail with respect to FIG. 4, a miniature controllably actuated mirror system. The miniature support structure 300 includes a platform 302, a support element 304, and an elongated knife-edge shaped magnetic bearing 306. According to the illustrative embodiment, the platform 302 is substantially cylindrical having opposed surfaces 308 and 310. The surface 308 is substantially circular, while the surface 310 is substantially annular. The platform 302 is similar to the platforms 102 and 202 of FIGS. 1 and 2, respectively.

However, rather than having a centrally located hemispherical 114 or conical 214 cavity, the platform 302 includes a diametrically extending v-shaped cavity 314, formed into the surface 310. The cavity 314 includes two inner surfaces 316a and 316b, which intersect to form a diametrically extending apex 328. The knife-edge magnetic bearing 306 seats within the diametrically extending apex 328. As indicated by the arrows 330a and 330b, a significant operational difference between the embodiment 300 of FIG. 3 and the embodiments 100 and 200 of FIGS. 1 and 2, respectively, is that the motion of the platform 302 is restricted to a single axis or rotation about the diametrically extending apex 328. In some embodiments, the v-shaped cavity 314 extends across the entire diameter of the 310. However, in other embodiments, the v-shaped cavity extends only along part of the diameter.

Other than the pivot restriction imposed by the knife-edge bearing 306 and the v-shaped cavity 114, the remaining features of the support structure 300 are substantially the same as those of the support structures 100 and 200. Particularly, the inner surfaces 316a and 316b are similar to the inner surface 116 of the cavity 114. The support element 304 is also substantially the same as the support element 104. However, rather than including a receptacle, the knife-edge bearing 306 mounts to a substantially flat surface 320 on the support element 304. As in the prior examples, the cavity 314 has a peripheral edge 324, and the support element 304 has an outer surface 326, the geometries of which together define the maximum angle of platform tilt, $\theta_{max}$.

Figure 4:
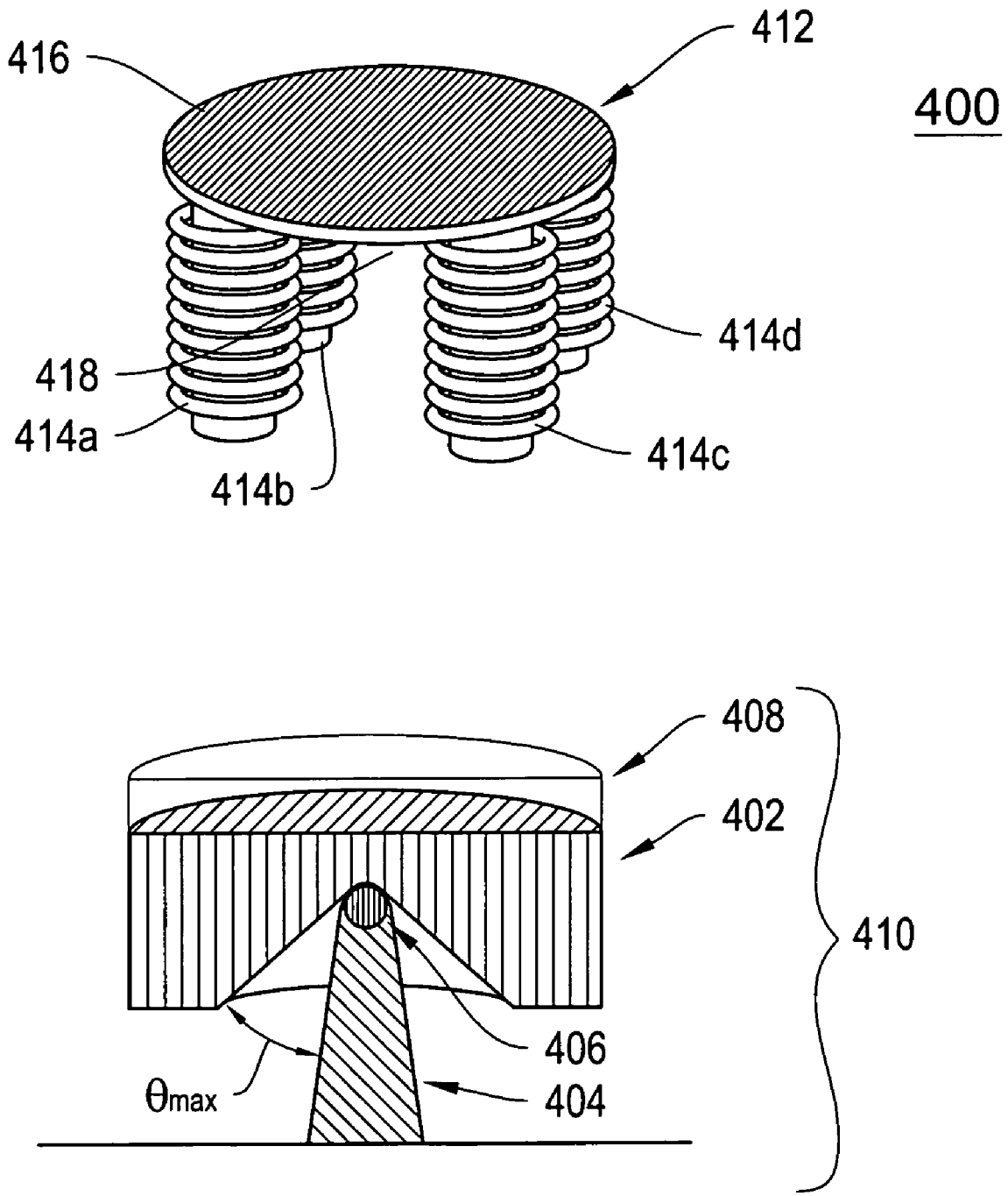
FIG. 4 is a system including the support structure of FIG. 2 along with a magnetic platform actuator according to an illustrative embodiment of the invention.

FIG. 4 is a cross-sectional view of a miniature actuatable platform system 400, according to an illustrative embodiment of the invention. Although the system 400 is particularly described with regard to positioning of a reflector/mirror, it may be used for any application. The system 400 includes the miniature platform 402 and support structure 410, and a magnetic platform actuator 412. The system 400 also includes a reflector 408, which may be formed separately from or integrally with the platform 402.

According to the illustrative embodiment, the magnetic platform actuator 412 includes four coils 414a-414d, and a base 416. However, the magnetic platform actuator 412 may include any desirable number of coils. In operation, the coils 414a-414d are driven with current in a controlled manner to move the platform 202. More specifically, by providing current to individual coils 414a-414d or combinations of coils, the platform 202 is made to tilt in the desired direction. For example, the coils may be operated in pairs, such as coils 414a and 414c, to provide a push-pull torque.

By regulating the current drive to the coils 414a-414d, the reflector 408 may be controllably positioned, for example, for optical beam steering, imaging or other applications. For example, the current drive may sweep the coils 414a-414d sequentially causing the platform 202 to sequentially tilt toward each successive coil to create a circular scanning motion. Alternatively, a raster scan may be achieved by applying a sine or square wave to one axis, while slowly ramping the current to the second axis with a sawtooth or triangle waveform. Coils 414a-414d may be operated in pairs to create torque about 2 orthogonal axes. A circular scan may be achieved by driving these two coil pairs with current waveforms 90 degrees out of phase, such as sine and cosine waves, or square waves phase-shifted by 90 degrees. The amplitude of the drive currents can be varied to vary the size or maximum angle of the circular scan. Additionally, by varying the intensity of the current during and/or for each successive sweep of the coils 414a-414d, successive raster scans of any desirable shape may be achieved.

Although the magnetic platform actuator 412 is shown as being positioned near the mirror side 408 of the platform 402, the magnetic actuator 412 may be positioned in any suitable location, including near the support side 404 of the platform 402 miniature mirror support structure 410. Similarly, although the coils 414a-414d are positioned parallel to each other, evenly spaced along the periphery of the base 416, the coils 414a-414d may be positioned in any suitable arrangement on the base 416. According to the illustrative embodiment, the coils 414a-414d are constructed of copper. However, they may be made from any suitable conductor. Additionally, the coils 414a-414d may be swept in any desirable pattern, or in a random or substantially random pattern, depending on application.

Figure 5:
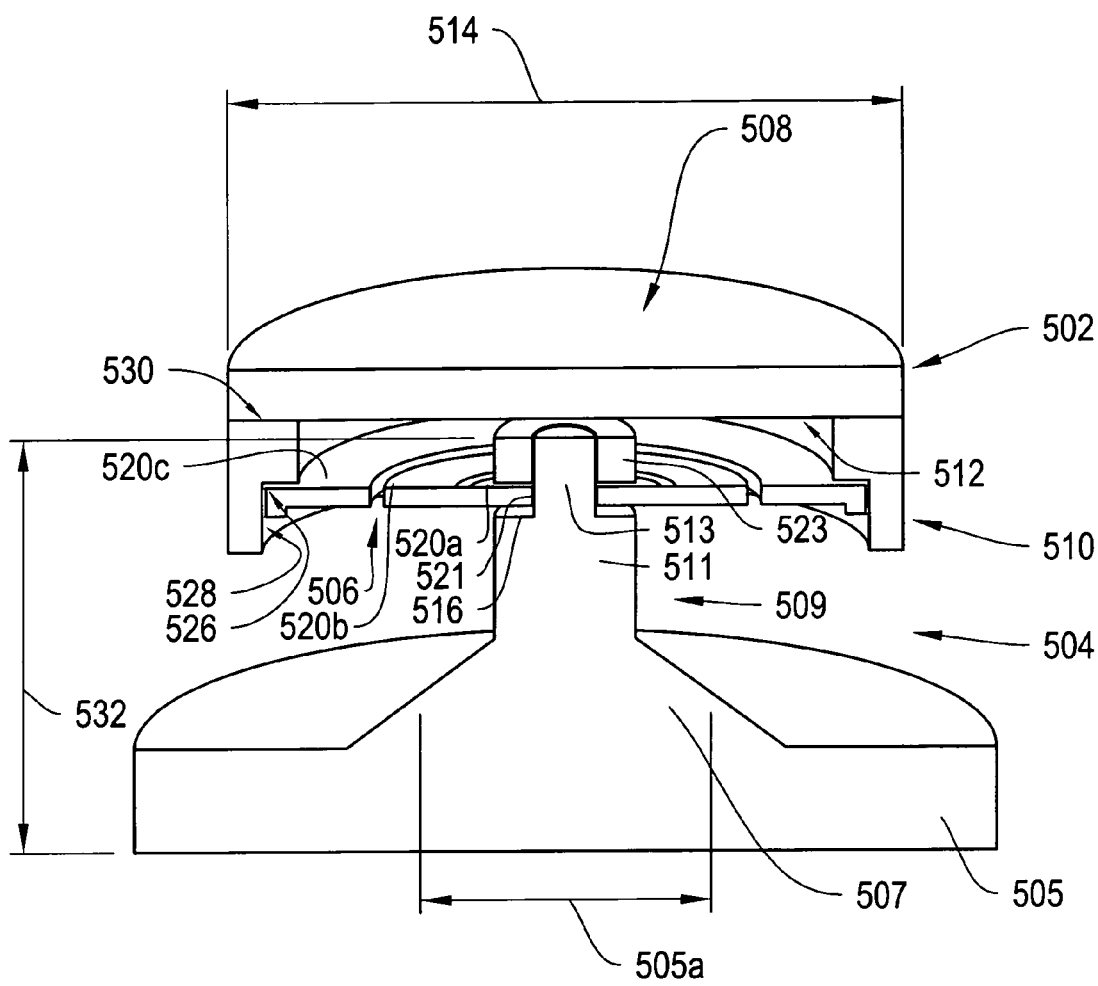
FIG. 5 is a cross-sectional view of a gimbaled assembly for multi axis positioning of a platform and having a stationary central support structure according to another illustrative embodiment of the invention.
Figure 6A:
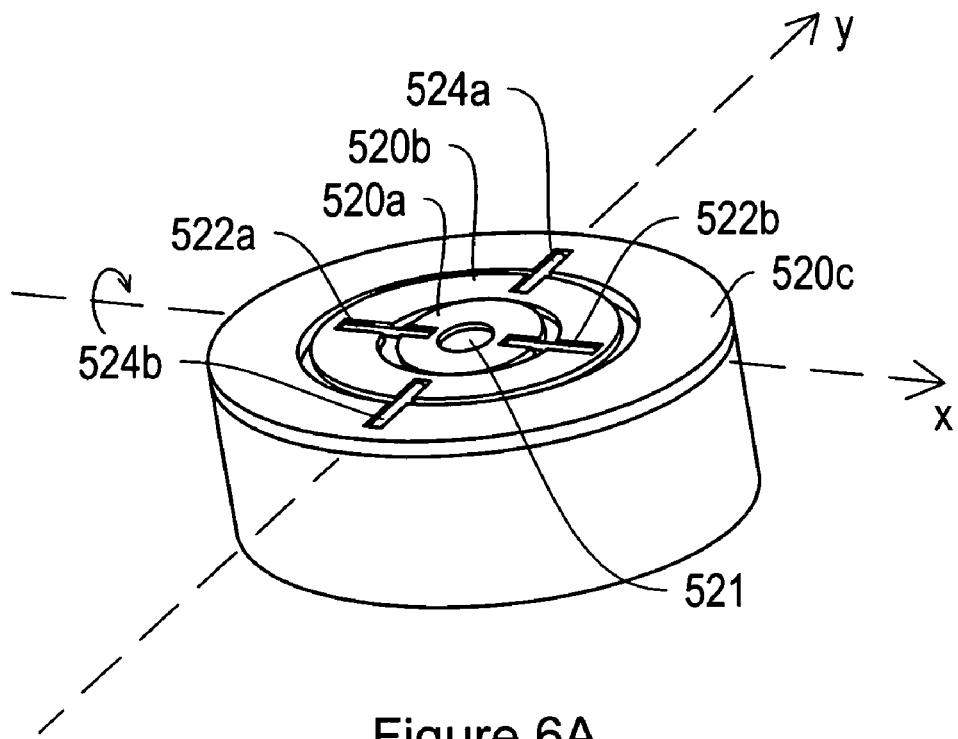
FIG. 6A is a top perspective view of an exemplary gimbal platform assembly for use with the assembly of FIG. 5 illustratively rotated about a y-axis.
Figure 6B:
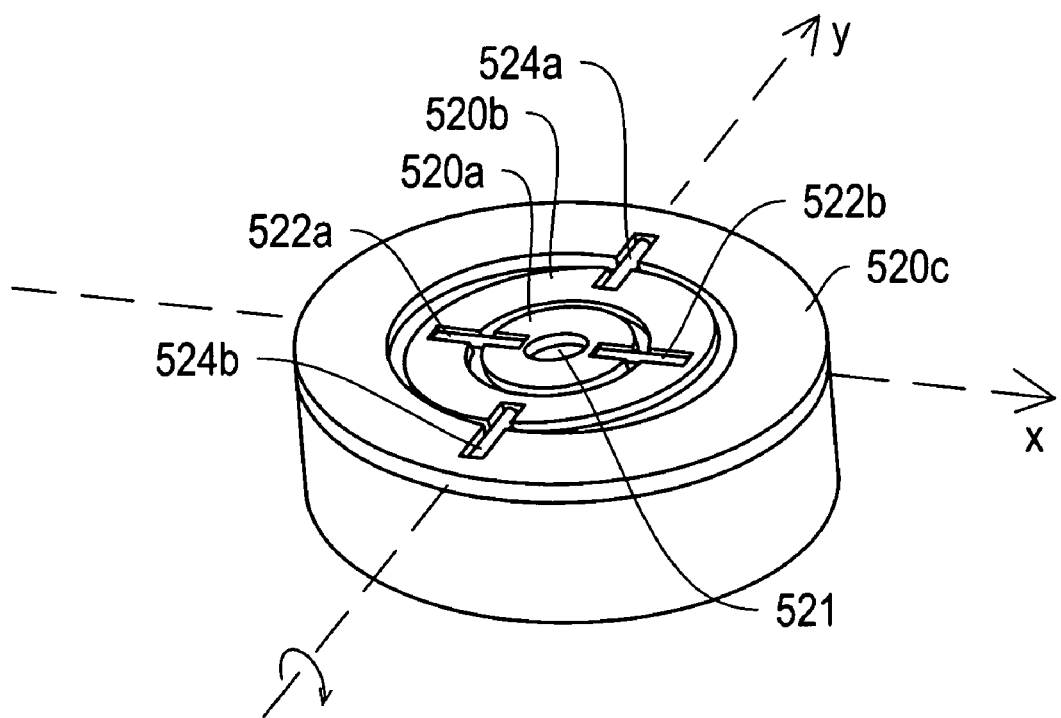
FIG. 6B is a top perspective view of the gimbal platform assembly of FIG. 6A illustratively rotated about an x-axis.
Figure 7A:
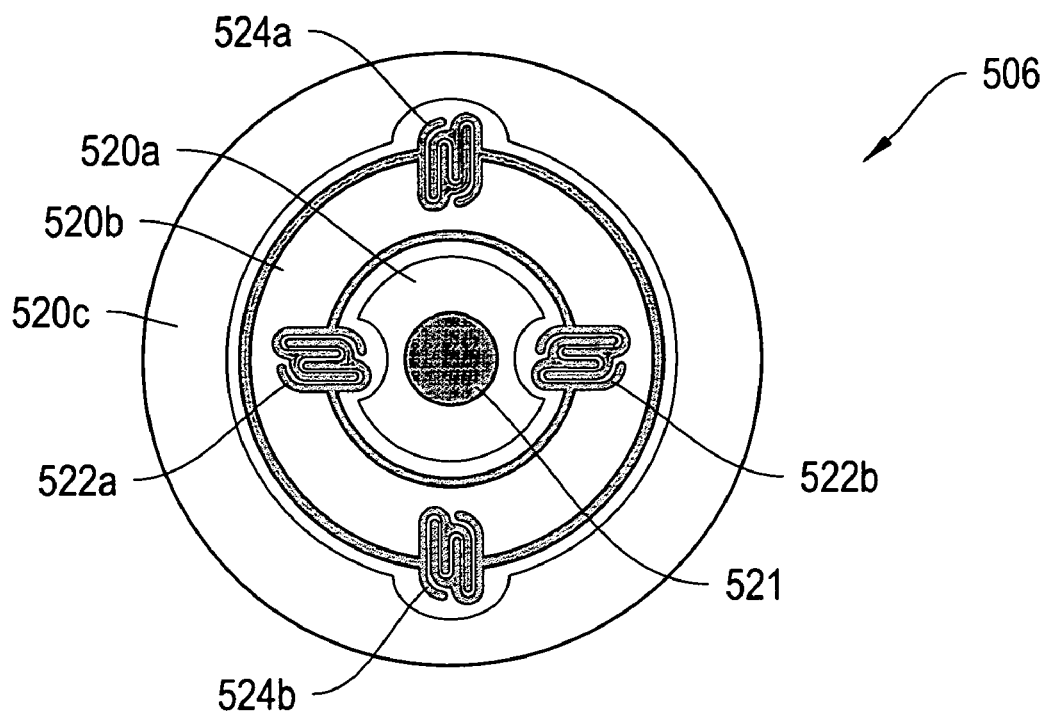
FIG. 7A is a top view of a gimbal platform assembly of the type depicted in FIGS. 5-6B and employing integrally formed rotational flexures according to an illustrative embodiment of the invention.

FIG. 5 is a cross-sectional view of a gimbaled platform assembly 500 for two axis platform pivoting according to another illustrative embodiment of the invention. The gimbaled mirror assembly 500 includes a platform 502, a support structure 504, a gimbal 506, and a magnet 510. FIGS. 6A and 6B are conceptual top perspective views of the gimbal 506 and magnet 510 of FIG. 5. FIG. 7A is a top view of a gimbal 506. Referring to FIGS. 5-7A, according to this illustrative embodiment, rather than having a single gimbal plate (analogous to the single platforms 102 and 202) the gimbal 506 of the platform assembly 500 includes first 520a, second 520b, and third 520c plates, configured as concentric toroids, with the first plate 520a being the innermost toroid, the second plate 520b being next, followed by the outermost third plate 520c.

As shown in FIGS. 6A-7A, the assembly 500 includes two pairs of rotational flexures. The first pair of rotational flexures 522a and 522b extend generally along the x-axis and rotatably interconnect the innermost plate 520a to the middle plate 520b. Similarly, the second pair of rotational flexures 524a and 524b extend generally along the y-axis and rotatably interconnect the middle plate 520b to the outermost plate 520c. According to the illustrative embodiment, the gimbal 506, including the plates 520a-520c and the flexures 522a, 522b, 524a and 524b are constructed monolithically from silicon. However, according to alternative illustrative embodiments, any suitable material may be used.

Figure 7B:
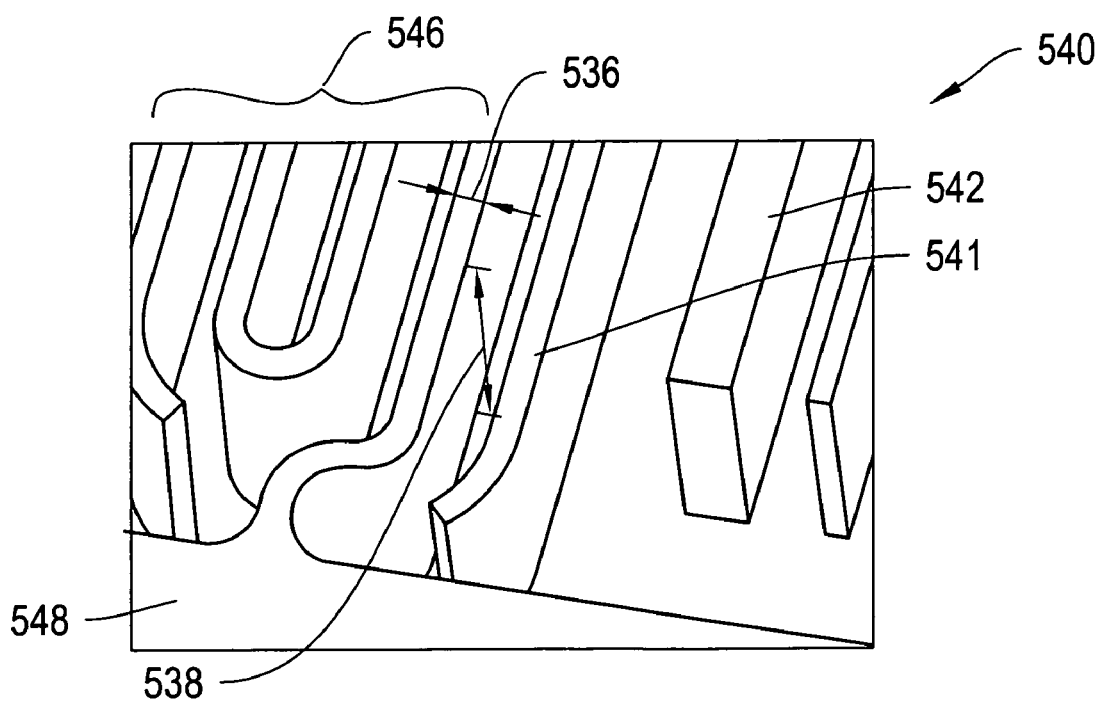
FIG. 7B is a magnified view of partially fabricated, folded rotational flexures similar to those of FIG. 7A.

FIG. 7B is a magnified view of a portion of a folded flexure 540 similar to flexure 524a. The flexure 540 has only been partially fabricated, and is still attached to a substrate. Additionally, other etched features called etch buffers 541 and lateral stops 542, which will eventually be removed, are visible. Etch buffers 541 are used to improve the uniformity of the plasma etch process of deep reactive ion etching. Lateral stops 542 are used to limit motion of the platform 548 and flexures 546 due to shock or vibration. According to various illustrative embodiments, the rotational flexures 522a-522b and 524a-524b have a width of between about 1 µm and about 10 µm and a thickness/depth of about 10 µm to about 100 to permit such relative movements. As shown in FIG. 7B, in one configuration, the width 536 of the flexures 522a-522b and 524a-524b is about 6 µm and the thickness/depth 538 of the flexures 522a-522b and 524a-524b is about 50 µm. According to the illustrative embodiment, the rotational flexures 522a-522b and 524a-524b have a resonant frequency of about 250 Hz to about 750 Hz when supporting a platform 502 and a magnet 510. In one illustrative configuration, the rotational flexures 522a-522b and 524a-524b have a resonant frequency of about 500 Hz. The illustrative plates 520a-520c have a thickness of between about 20 µm and about 750 µm. In one illustrative configuration, the plates 520a-520c have a thickness of about 400 µm. In one configuration, the inner 520a, middle 520b, and outer 520c plates, along with both sets of flexures 522a-522c and 524a-524b, are formed monolithically from silicon. According to one configuration, the outermost plate 520c of the gimbal has an outside diameter of between about 500 µm and about 2 mm.

The support structure 504 includes a base 505, a transition portion 507 and a support post 509. The illustrative base 505 is substantially circular, but this need not be the case. The transition portion 507 extends axially out of a central location in the base 505 and has a diameter 505a that tapers smaller as the transition portion extends away from the base 505. The support post 509 extends axially out of the transition portion 507. The tapered transition portion 507 provides increased structural support for the support post 509. The support post 509 includes first 511 and second 513 sections. The second section 513 has a reduced diameter relative to the first section 511 forming a radially extending shoulder 516 at a transition between the first 511 and second 513 sections.

The innermost plate 520a has a centrally located through aperture 521, which slidably interfits over the reduced diameter section 513 of the support element 509 causing the plate 520a to abut and rest on the shoulder 516. A cap 523 interfits over the reduced diameter section 513 locking the gimbal 506 onto the support element 509. According to some illustrative embodiments, the gimbal 506 is rotatable about the reduced diameter section 513 of the support post 509.

However, according to the illustrative embodiment of FIGS. 5-6B, the innermost plate 522a is positionally fixed onto the support post 509, and the flexures 522a and 522b are sized and shaped to permit the middle plate 520b to rotate about the x-axis relative to the innermost plate 520a (shown in FIG. 6A). Similarly, the flexures 524a and 524b are sized and shaped to permit the middle 520b and outermost 520c plates to rotate about the y-axis relative to each other (shown in FIG. 6B).

The gimbal platform 502 may be controllably positioned by adjusting the tilt of the middle 520b and outermost 520c plates along the flexures 522a-522b and 524a-524b. To produce a scanning motion of the platform 502, it may be tilted to a first position about the x-axis about the flexures 522a-522b, and then tilted to a plurality of positions along the y-axis about the flexures 524a and 524b. The platform 502 may then be tilted to a second position about the x-axis. The platform 502 may have a resonant frequency about the flexures 522a-522b, such that enhanced motion occurs at drive frequencies near the resonant frequency. Similarly, the platform 502 may have a resonant frequency about the flexures 524a-524b, such that enhanced motion occurs at drive frequencies near the resonant frequency. The resonant frequency of the gimbaled platform assembly 500 may be about 50 Hz to about 20 kHz, and the resonant frequency about the first flexure pair 522a-522b may be substantially similar to or substantially different from the resonant frequency of the second flexure pair 524a-524b. Other possible scanning motions include a circular scan, including tilting along both axes. The controllable actuation of the platform 502 is described in further detail with respect to FIG. 8.

As shown in the cross-sectional view of FIG. 5, the magnet 510 is also toroid shaped and includes an inner wall 528 having a radially inward extending shoulder 526. The magnet 510 mounts over the gimbal 506 such that the shoulder 526 abuts and is supported by an outer periphery of the outermost gimbal plate 520c. In the particular configuration of FIG. 5, the shoulder is axially positioned along the wall 528 so that the wall 528 extends axially past the gimbal 506 toward the support base 505.

The platform 502 has a substantially cylindrical disk shape with opposed substantially circular surfaces 508 and 512. The platform surface 512 mounts onto an uppermost surface 530 of the magnet 510. The platform 502 has an outside diameter 514 of between about 0.3 mm and about 5 cm. As in the case of the platforms 102, 202 and 302, although the surfaces 508 and 512 are shown as being substantially circular, they may have any suitable geometrical shape, including, without limitation, having any suitable polygonal or ovular shape.

As also in the case of the platforms 102, 202 and 302, the surface 508 of the platform 502 is or includes a portion that is reflective. Alternatively, the surface 508 may include a reflective coating or other treatment. Although the surface is shown as being substantially flat, it may be any suitable shape, including, without limitation, convex, concave, and faceted, or including any suitable combination of flat, convex, concave, and faceted portions.

According to the illustrative embodiment of FIG. 5, the platform 502 may be constructed of silicon, plastic, glass, or any other suitable reflective material. The support element 504 is non-magnetic, and constructed, for example, of titanium, aluminum, brass, bronze, plastic, or any other suitable non-magnetic material. According to a preferred illustrative embodiment, the gimbal 506 may be constructed of silicon. However, any other suitable material may be used. The magnet 510 may be constructed of NdFeB, SmCo, Ferrite, Pt—Co, AlNiCo, or any other suitable magnetic material.

In alternative configurations, rather than employing the toroidal magnet 510 mounted on the gimbal 506, the assembly 500 includes one or more magnets mounted over the gimbal 506. In one example, such magnets are mounted on the underside 512 of the platform 502. Alternatively, a magnetic coating may be applied to the underside 512 of the platform 502. In the examples using the toroidal magnet 510, a magnetic coating, or one or more magnets mounted to the platform 502, there is no need for the platform 502, itself, to be formed from a ferromagnetic material.

The platform 502 is controllably movable in three dimensional space about the x- and y-axes. According to one advantage, the gimbaled platform assembly 500 may be rotated and moved as a unit to any desirable orientation relative to a three-dimensional space, since the inner plate 520*a* of the gimbal 506 is securely coupled to the support element 504 with the cap 523.

Figure 8A:
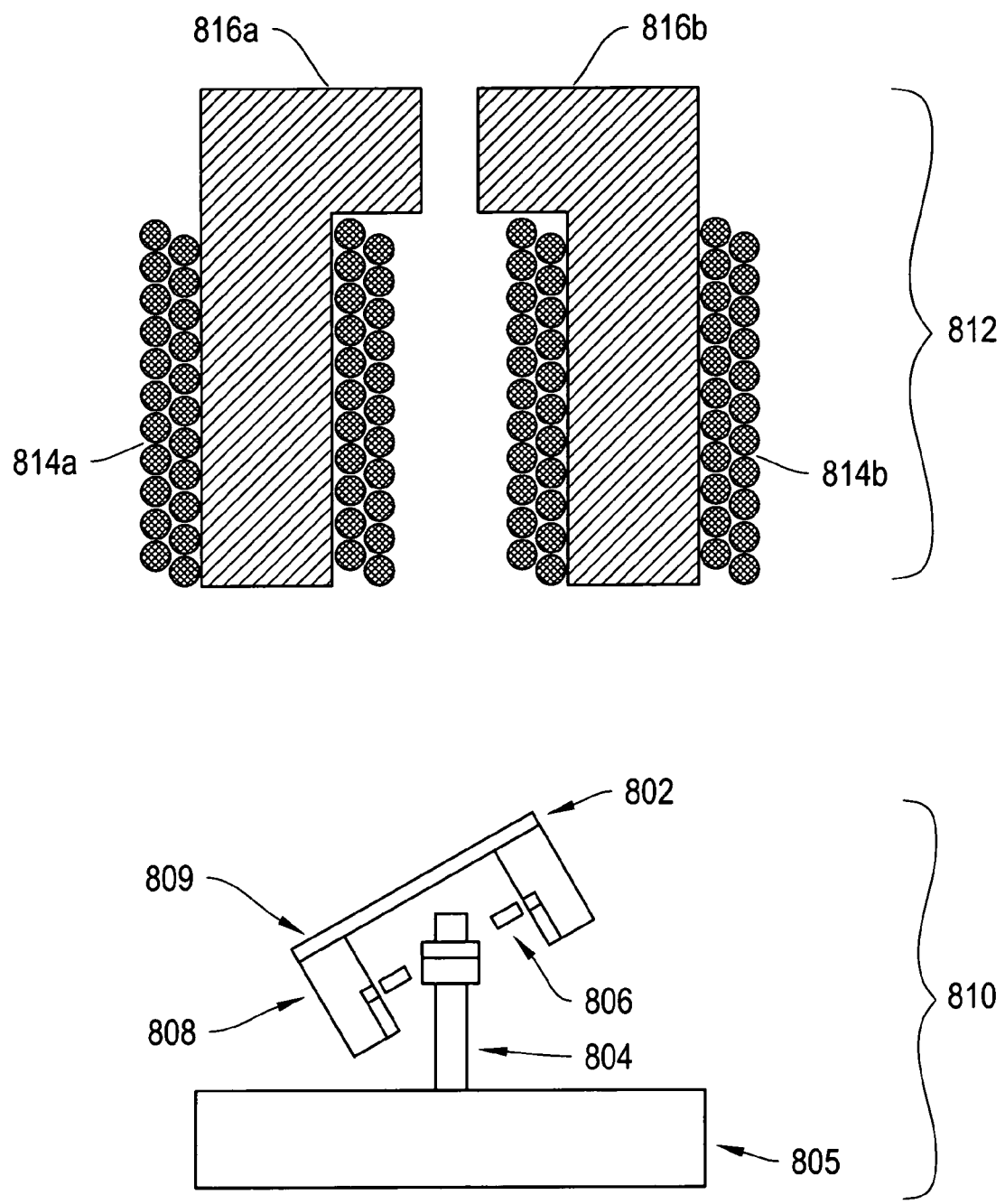
FIGS. 8A-8B are a cross-sectional conceptual diagram of a system including a gimbaled platform assembly of the type depicted in FIGS. 5-7 and a magnetic platform actuator according to an illustrative embodiment of the invention.

FIG. 8A is a cross-sectional view of a conceptual diagram of system 800 including a gimbaled assembly 810 of the type depicted in FIGS. 5-7B and a magnetic platform actuator 812 according to an illustrative embodiment of the invention. The gimbaled assembly 810 is similar to the gimbaled assembly 500 of FIG. 5, and includes a platform 802, a support element 804, a gimbal 806, and a magnet 808. The illustrative support element 804 is positioned substantially in the center of the gimbal 806.

Figure 8B:
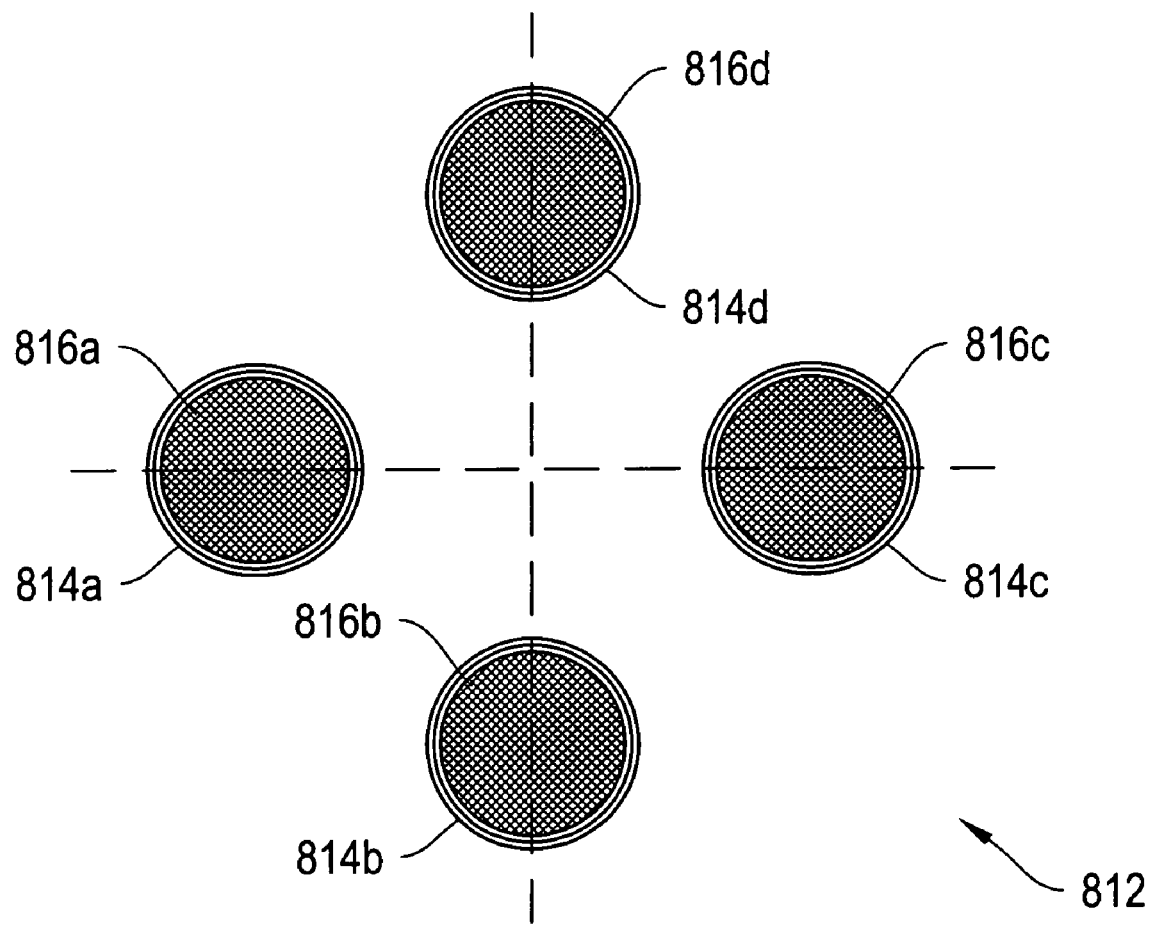

Generally, the magnetic platform actuator 812 includes four coils 814*l*-814*d*, as shown in the top-perspective view of FIG. 8B. However, in the cross-sectional diagram 800 of FIG. 8A only two coils 814*a*-814*b* of the actuator 812 are shown. According to other illustrative embodiments, the magnetic platform actuator 812 may include any desirable number of coils. The coils 814*a* and 814*b* are mounted on coil supports 816*a* and 816*b*. In operation, the coils 814*a*-814*b* are driven in a controlled manner, in substantially the same manner as that described above with respect to FIG. 4.

Although the magnetic platform actuator 812 is shown as being positioned near the mirror side 809 of the gimbaled mirror assembly 810, the magnetic actuator 812 may be positioned in any suitable location, including near the support base 805 side of the platform 802. Similarly, although the coils 814*a* and 814*b* are positioned parallel to one another, the coils 814*a* and 814*b* may be positioned in any suitable arrangement, such as the arrangements discussed above with regard to FIG. 4. According to the illustrative embodiment, the coils 814*a* and 814*b* are constructed of copper. However, they may be made from any suitable material.

According to an illustrative embodiment, the coil supports 816*a*-816*b* may be non-magnetic. In one configuration, the coil supports 816*a*-816*b* are constructed of titanium, aluminum, brass, bronze, plastic, or any other suitable non-magnetic material. According to an alternative illustrative embodiment, the coil supports 816*a*-816*b* may be constructed of a soft magnetic material, such as Permalloy, CoFe, Alloy 1010 steel, or any other suitable soft magnetic material.

Figure 9A:
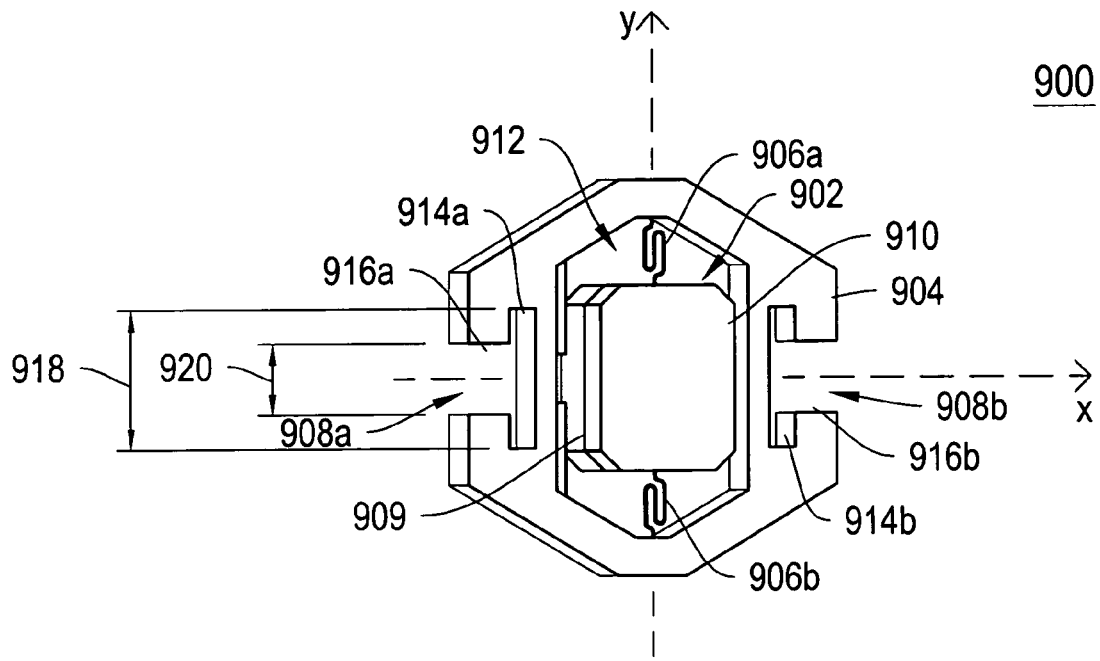
FIGS. 9A-9E depict gimbaled platform assemblies for multi-axis positioning of a platform having a stationary outer frame according to various additional illustrative embodiments of the invention.
Figure 9B:
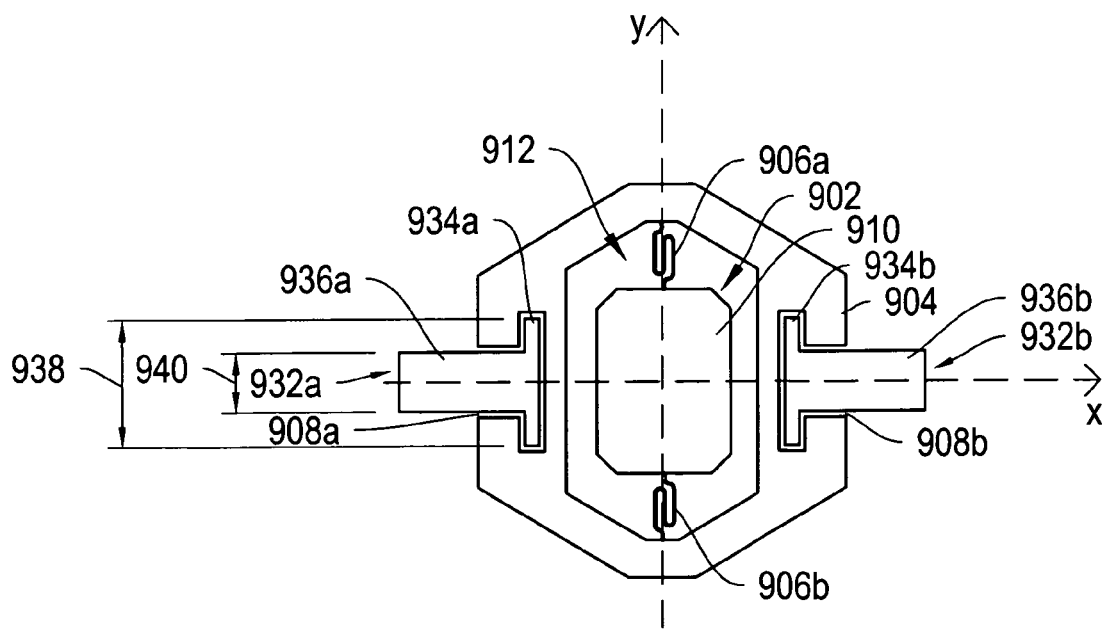
Figure 9C:
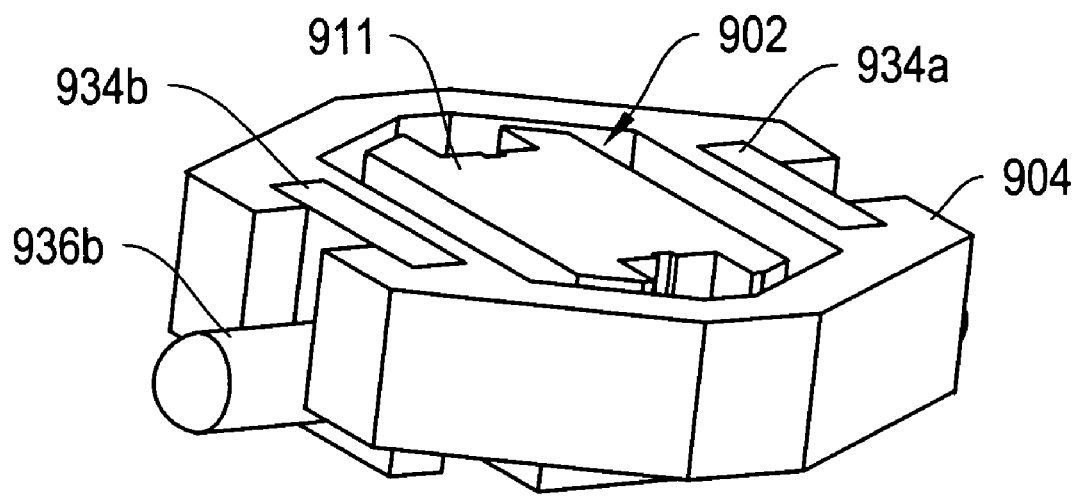
Figure 9D:
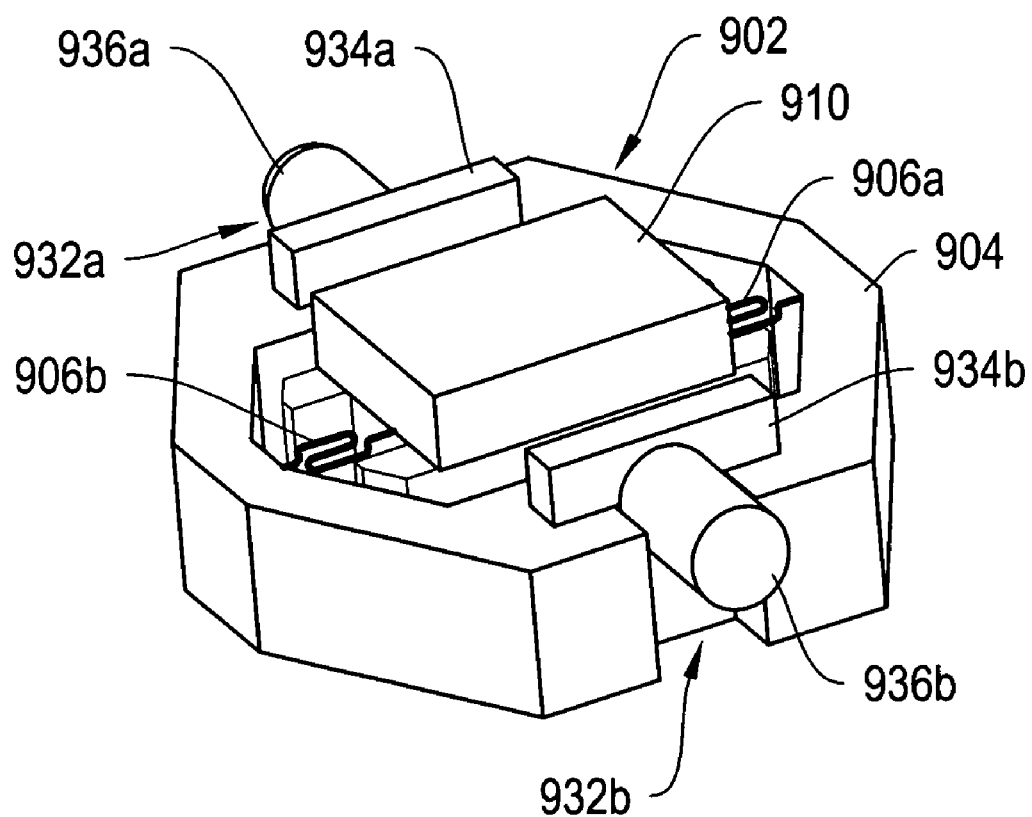

FIGS. 9A-9E depict miniature gimbaled mirror assemblies according to other illustrative embodiments of the invention. In contrast to the previously discussed stationary central support structure embodiments, the illustrative embodiments of FIGS. 9A-9E have moveable platforms rotationally mounted to a stationary or rotating frame/support. More specifically, FIG. 9A depicts a gimbaled mirror assembly 900 having a moveable inner platform, according to one illustrative embodiment of the invention. The gimbaled mirror assembly 900 includes a platform 902, a frame 904, and rotational flexures 906*a*-906*b*. FIGS. 9B-9D depict further illustrative embodiments of the gimbaled mirror assembly 900 of FIG. 9A.

Referring to FIGS. 9A-9D, the frame 904 is substantially octagonal with a large octagonal through aperture 912. The platform 902 is generally rectangular and lies within the aperture 912 of the frame 904. However, the platform 902 and the frame 904 may have any suitable shape. According to the illustrative embodiment, the inner platform 902 is attached to the frame 904 with first 906*a* and second 906*b* rotational flexures. The rotational flexures 906*a*-906*b* are mounted (or formed) on substantially opposite sides of the platform 902, such that the flexures 906*a*-906*b* substantially align along one axis (e.g. the y-axis) of the platform 902. The rotational flexures 906*a* and 906*b* are substantially the same as the rotational flexures 524*a* and 524*b* shown in and described with respect to FIGS. 7A and 7B. According to one feature, the platform 902 rotates via the rotational flexures 906*a* and 906*b* about the y-axis, while the outer frame 904 remains stationary. However, as described in further detail below with respect to FIGS. 10 and 11, the frame 904 may be rotationally mounted to a support structure.

According to the illustrative embodiment, the outer frame 904 includes first and second receptacles 908*a* and 908*b*. The receptacles 908*a* and 908*b* are formed in substantially opposite sides of the frame 904, such that the receptacles 908*a* and 908*b* are substantially aligned along the x-axis. The receptacles 908*a* and 908*b* have interior portions 914*a* and 914*b* and exterior portions 916*a* and 916*b*, with the interior portions 914*a* and 914*b* having a width 918 that is larger than the width 920 of the exterior portions 916*a* and 916*b*.

Figure 10:
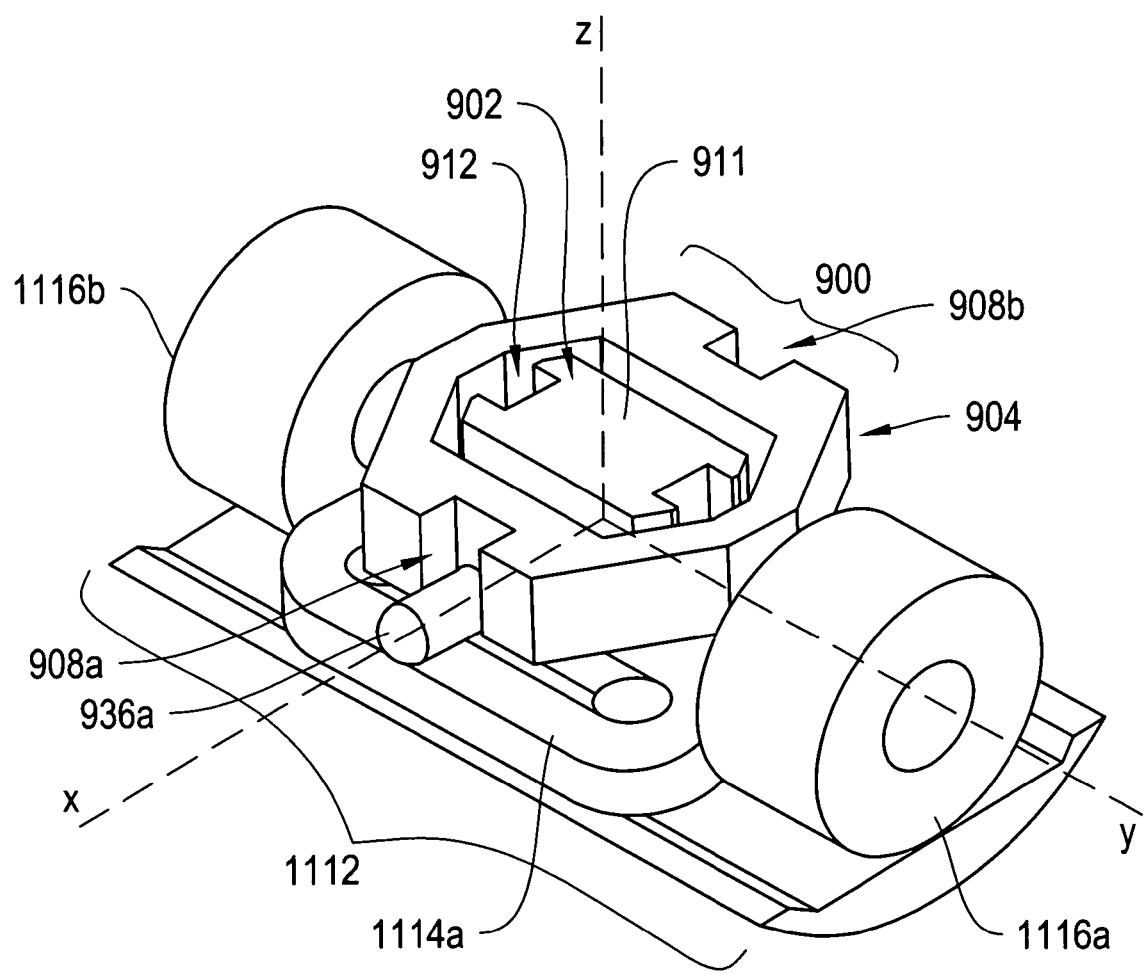
FIG. 10 is a support system including the gimbaled platform assembly of FIG. 9B along with magnetic platform actuators according to one illustrative embodiment of the invention.
Figure 11:
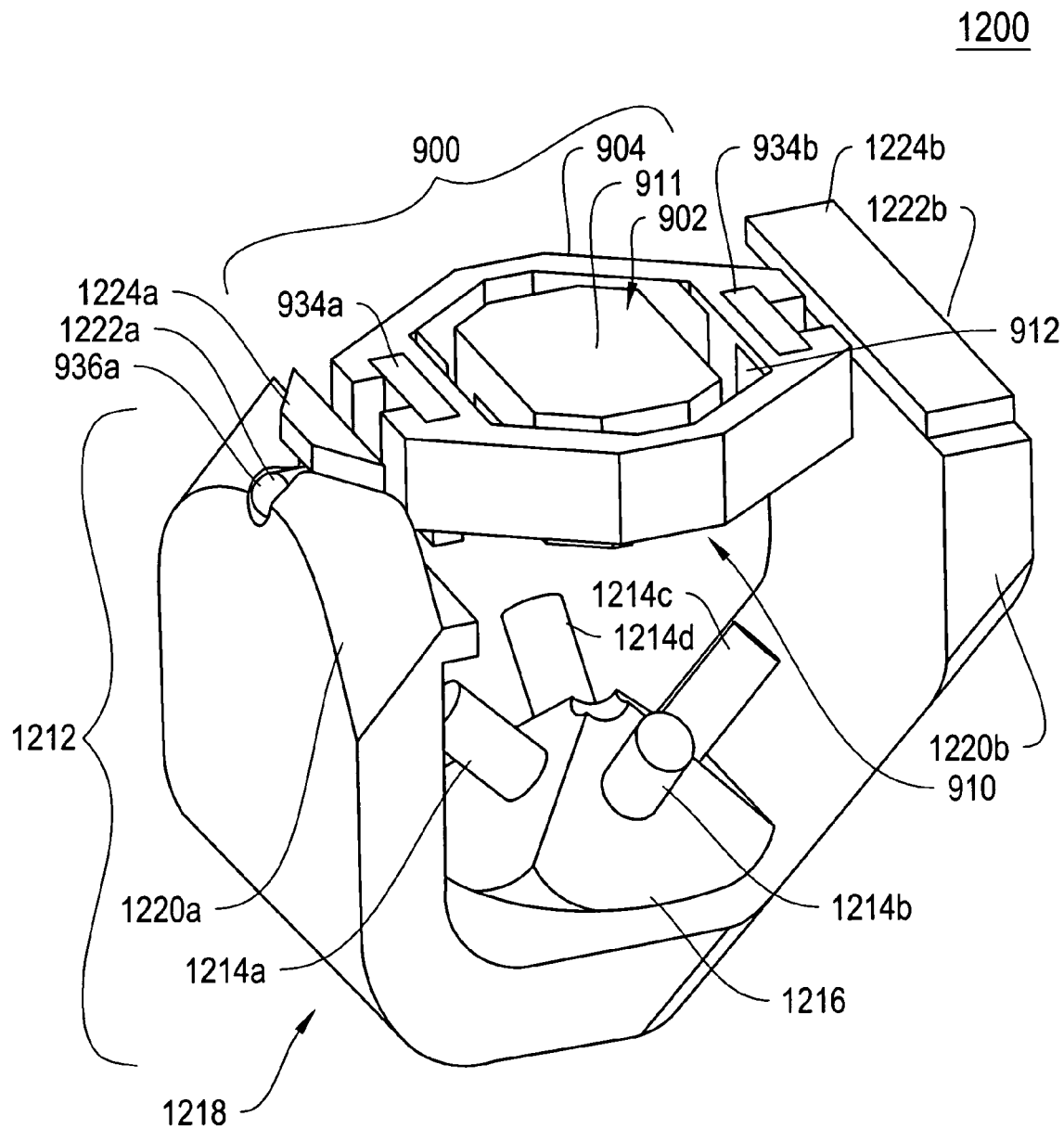
FIG. 11 is a support system of the type depicted in FIG. 10 but employing magnetic platform actuators according to an alternative illustrative embodiment of the invention.

The receptacles 908*a* and 908*b* may be used for rotationally mounting the frame 904 to a support structure, as described in further detail with respect to FIGS. 10-11. According to one feature, when mounted to a support structure, the outer platform 904 may rotate about the x-axis.

As shown most clearly in FIGS. 9A and 9D, the platform 902 includes a magnet 910 attached to a surface 909. Although the magnet 910 is shown as being substantially flat, it may be any suitable shape and any suitable size. Additionally, the magnet 910 may cover only a portion of the surface 909. According to an alternative embodiment, the gimbaled platform assembly 900 includes a plurality of magnets 910 attached to the surface 909. According to the illustrative embodiment, the magnet 910 is magnetic and may be constructed of NdFeB, SmCo, Ferrite, Pt—Co, AlNiCo, or any other suitable magnetic material.

As shown most clearly in FIG. 9C, the platform 902 also includes a reflective component 911 on the platform 902 surface opposite the surface 909. According to one illustrative embodiment, the reflective component 911 is a mirror and may be constructed of silicon, plastic, glass, or any other suitable material. According to an alternative illustrative embodiment, the reflective component 911 is formed as a reflective coating. Additionally, although the reflective component 911 is shown as being substantially flat, it may be any suitable shape, including, without limitation, convex, concave, faceted, or including any combination of flat, convex, concave, and/or faceted portions.

According to the illustrative embodiment, the gimbaled assembly 900, including the platform 902, the frame 904, and the rotational flexures 906a-906b may be constructed monolithically from silicon. However, any other suitable material may be used. The platform 902 and the frame 904 may be non-magnetic, and may be constructed of titanium, aluminum, brass, bronze, plastic, or any other suitable material. Alternatively, the platform 902 and the frame 904 may be magnetic and may be constructed of NdFeB, SmCo, ferrite, Pt—Co, AlNiCo, or any other suitable magnetic material. According to the illustrative embodiment, the magnet 910 may constructed of NdFeB, SmCo, ferrite, Pt—Co, AlNiCo, or any other suitable magnetic material.

As shown in FIGS. 9B-9D, the gimbaled assembly 900 may also include first 932a and second 932b spindles. The spindles 932a-932b are coupled to or formed integrally with the frame 904 and are shaped to interfit into the receptacles 908a-908b. According to the illustrative embodiment, the spindles 932a-932b have interior 934a-934b and exterior 936a-936b portions. The interior portions 934a and 934b of the spindles 932a-932b have a width 940 that is larger than the width 918 of the exterior portions 936a and 936b of the spindles 934a-934b.

According to one illustrative embodiment, the first 932a and second 932b spindles are positionally fixed within the first 908a and second 908b receptacles, respectively. However, according to an alternative illustrative embodiment, the spindles 932a-932b are rotationally disposed within the receptacles 908a-908b. As shown most clearly in FIGS. 9C and 9D, the exterior portions 936a and 936b are substantially cylindrical, and as described in more detail below with respect to FIGS. 11-12 suitable for rotational mounting the frame 904 to a support structure.

The spindles 932a-932b may be constructed monolithically from silicon with the remainder of the frame 904, or may be constructed separately from the frame 904 using any suitable spindle material. The spindles 932a-932b may be non-magnetic, and may be constructed of titanium, aluminum, brass, bronze, plastic, or any other suitable material. Alternatively, the spindles 932a-932b may be magnetic and may be constructed of NdFeB, SmCo, ferrite, Pt—Co, AlNiCo, or any other suitable magnetic material.

Figure 9E:
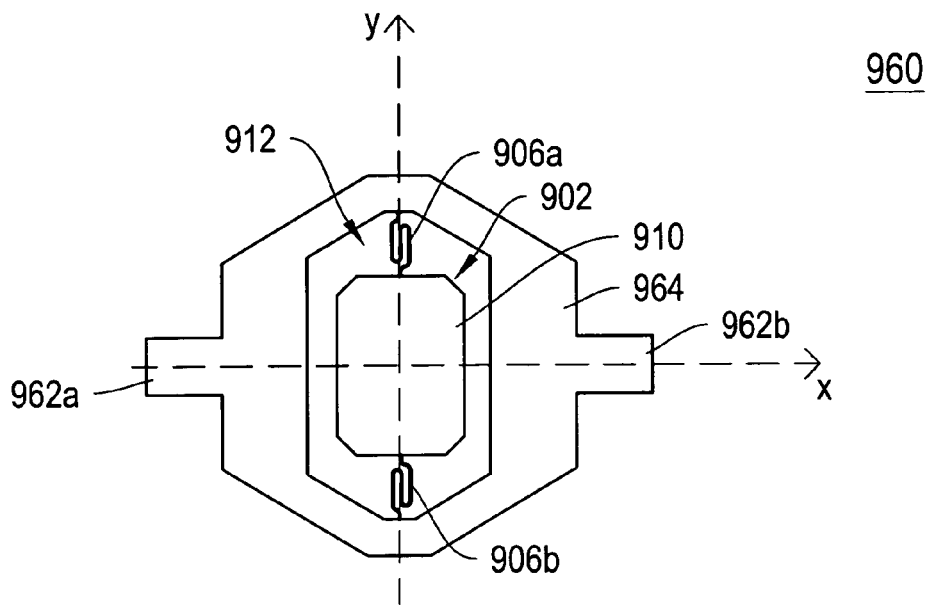

FIG. 9E depicts a gimbaled assembly 960 similar to the assembly 900 of FIGS. 9A-9D, but including spindles 962a and 962b integrally formed into the frame 964. According to this illustrative embodiment, the first 962a and second 962b spindles are formed on substantially opposite sides of the frame 964, such that they are substantially aligned along the x-axis. The spindles 962a-962b are substantially cylindrical, but they may be any suitable geometric shape. As in the case of the spindles 932a and 932b, the spindles 962a-962b may be used for rotationally mounting the frame 964 a support structure.

According to the illustrative embodiment, the spindles 962a-962b are constructed of the same material as the frame 964, and may be formed monolithically with the frame 964 of silicon. However, any other suitable material may be used. The frame 964 and the spindles 962a-962b may be non-magnetic, and may be constructed of titanium, aluminum, brass, bronze, plastic, or any other suitable material. Alternatively, the frame 964 and the spindles 962a-962b may be magnetic and may be constructed of NdFeB, SmCo, ferrite, Pt—Co, AlNiCo, or any other suitable magnetic material.

Figure 9F:
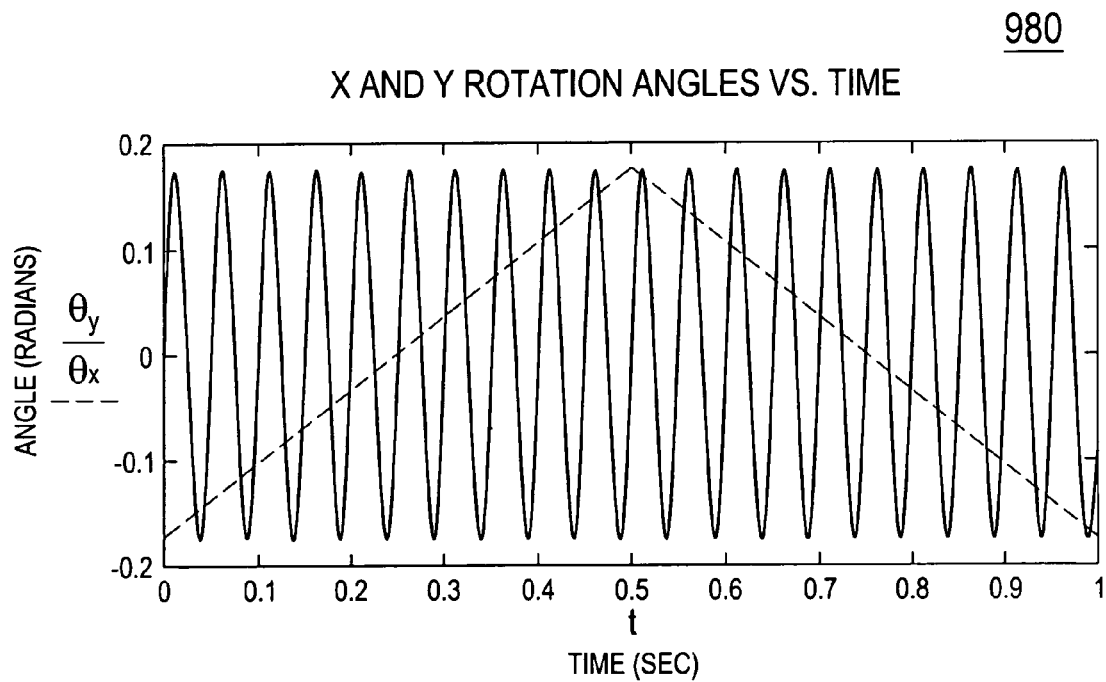
FIG. 9F is a graph depicting illustrative raster scan angles for a fast resonant axis and the slow non-resonant axis of tilt over time, according to an illustrative embodiment of the invention.

FIG. 9F is a graph 980 indicating relative platform and frame positions, according to an illustrative embodiment of a method for controlling the mirror system to produce a raster scan. The graph 980 shows illustrative raster scan tilt angles over time. The solid line shows the tilt angle of the platform 902, which, as shown, changes in a sinusoidal fashion. The frequency of the platform 902 motion corresponds to the resonant frequency of the rotational flexures 906a and 906b supporting the platform 902 and the magnet 910. The dotted line represents the tilt angle of the frame 904, which, according to this implementation, changes in a triangular wave ramp fashion. The frame 904 tilts back and forth along the spindles 932a and 932b, typically at a substantially slower frequency than the movement of the platform 902 about the rotational flexures 906a and 906b. According to one feature, in contrast to the system 500, the use of the spindles 932a and 932b instead of a second pair of rotational flexures more readily allows for the non-resonant tilting illustrated in the graph 980. The combined motion of the platform 902 and the frame 904 produces a 2-axis raster scanning motion.

More specifically, according to one configuration, and as depicted in FIG. 9F, the peak tilt angle is 10 degrees of mechanical rotation of the platform 902 in either direction about each axis, which results in a total optical scan of 40 degrees along each axis. For illustrative purposes in FIG. 9F, the resonance of the fast axis is 20 Hz, and the ramp period is 1 second. In other implementations, the peak angle of mechanical rotation may be between about 3 degrees and about 45 degrees, resulting in total optical scans of about 12 degrees and about 180 degrees along each axis. The resonance of the fast axis may be substantially the same as the resonant frequency of the rotational flexures plus platform and magnet, and may be between about 100 Hz and about 20 kHz. The ramp period may be between about $1/40^{th}$ of a second and about 10 seconds.

FIG. 10 shows a miniature actuatably movable platform system 1100 including the gimbaled platform assembly 900 of FIG. 9B and a magnetic platform actuator 1112 according to an illustrative embodiment of the invention. The magnetic platform actuator 1112 includes first 1114a and second (not shown) y-axis magnetic coils for rotating the platform 902 around the y-axis, and first 1116a and second 1116b x-axis magnetic coils for rotating the frame 904 around the x-axis.

According to the illustrative embodiment, the y-axis magnetic coils, including the magnetic coil 1114a, are positioned substantially under the frame 904 and extend longitudinally on either side of the y-axis between the x-axis coils 1116a and 1116b and are substantially parallel next to each other. The second y-axis magnetic coil is obscured by the gimbaled platform assembly 900. The x-axis coils 1116a-1116b are toroid shaped and positioned on either side of the frame 904 an equal distance from the x- and z-axes. In operation, providing current to the x-axis coils 116a and 116b causes the frame 904 to rotate about the x-axis via the spindles 936a and 936b. Similarly, providing current to the y-axis coils including the coil 1114a causes the platform 902 to rotate about the y-axis via the flexures 906a and 906b.

FIG. 11 shows an alternative illustrative embodiment in which the gimbaled platform assembly 900 is rotationally mounted within a magnetic actuator 1212 according to another illustrative embodiment of the invention. The magnetic actuator 1212 includes a support structure 1218, a base 1216, and four magnetic coil supports 1214a-1214d. The support frame 1218 includes first 1220a and second 1220b support elements. The support elements 1220a-1220b each include a receptacle 1222a and 1222b, respectively, for receiving the spindles 936a-936b of the platform assembly 900. The receptacles 1222a and 1222b are depicted as notches. However, they may be grooves, channels, tunnels, or any other suitable shape for rotationally interfitting with the spindles 936a and 936b. According to one illustrative feature, covers 1224a and 1224b may be mounted over the receptacles 1222a and 1222b, respectively to secure the spindles 936a and 936b in the receptacles 1222a and 1222b.

Although the magnetic platform actuator 1212 is depicted with four coil supports 1214a-1214d, any desirable number of coil supports may be employed. In operation, coils such as those depicted in FIG. 4 are wound around the coil supports 1214a-1214d. The coils may be driven in a controlled manner to move the platform 902, in a similar fashion as described above with respect to FIG. 4. More specifically, supplying a drive current to the coils 1214b and 1214d causes the frame 904 to rotating about the spindles 936a and 936b, while supplying a drive current to the coils 1214a and 1214c causes the platform to rotate about the flexures 906a and 906b. By varying the pattern of the drive current provided to the available coils, a desirable motion of the platform 902 relative to a three dimensional space may be achieved. As in the above described applications, the configurations of FIGS. 10 and 11 may be employed, for example, for optical beam steering, imaging or other applications.

Figure 12:
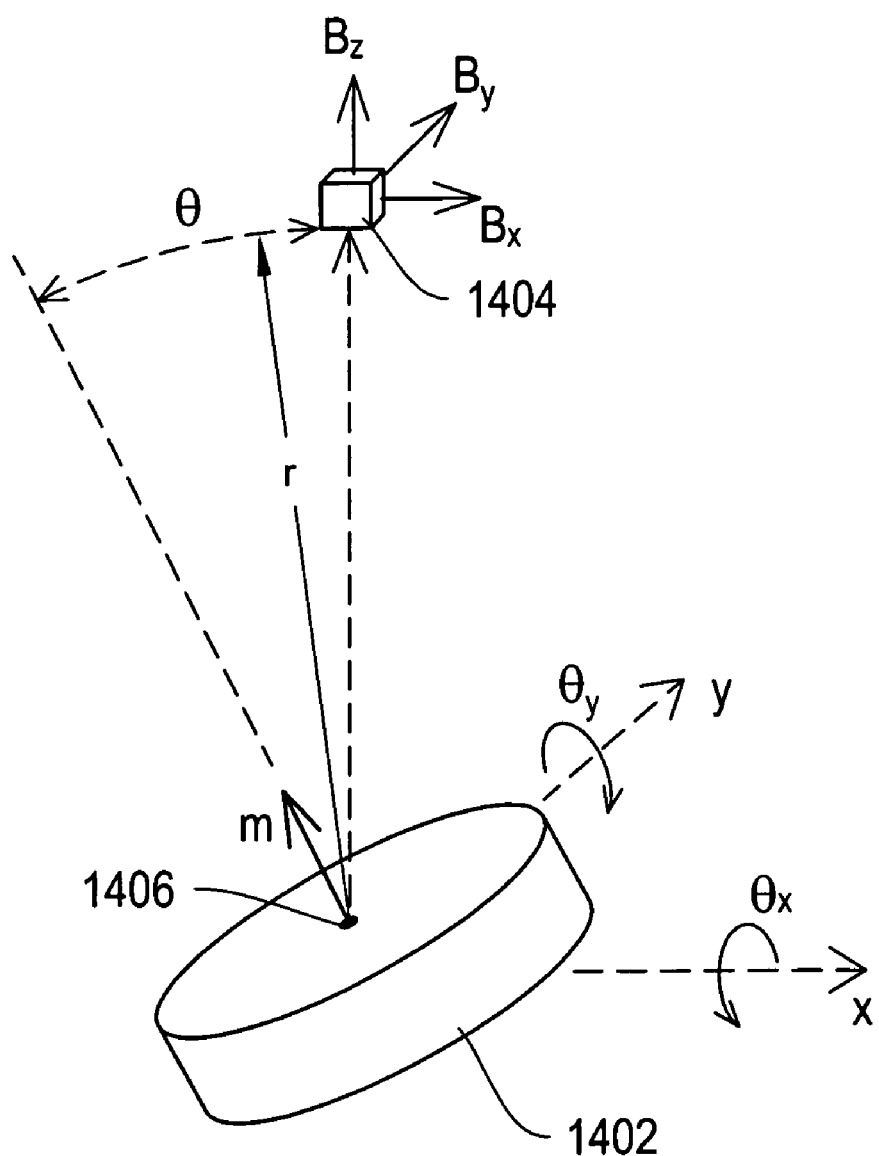
FIG. 12 is a conceptual diagram of an arrangement for platform position sensing according to an illustrative embodiment of the invention.

FIG. 12 is a conceptual diagram 1400 of an arrangement for platform position sensing according to an illustrative embodiment of the invention. The conceptual diagram 1400 includes a magnetic sensor 1404 for sensing the position of a platform 1402. The platform 1402 is either magnetic or includes one or more magnets mounted to it. According to the illustrative embodiment, the magnetic sensor 1404 is a Hall effect sensor capable of measuring angles of tilt of the platform 1402, based on a magnetic field of the platform. As the platform 1402 tilts about two axes, the Hall effect sensor 1404 measures the axes of tilt of the platform 1402.

According to the illustrative embodiment, the conceptual diagram 1400 shows two angles of tilt $\theta_x$ and $\theta_y$ for the platform 1402. The magnetic sensor 1404 is at least a 2-axis magnetic sensor and has at least $B_x$ and $B_y$ voltage outputs. However, a 3-axis magnetic sensor 1404 having $B_x$, $B_y$, and $B_z$ voltage outputs may be employed. According to the illustrative embodiment, the $B_z$ output may be used to normalize the $B_x$ and By outputs. The magnetic sensor 1404 measures both angles of tilt $\theta_x$ and $\theta_y$ of the platform 1402 and has a voltage output proportional to the sine of each angle $\theta_x$ and $\theta_y$. According to one feature, this results in a smooth, approximately linear output, which may be used to control the angles $\theta_x$ and $\theta_y$ of the platform 1402, as described in further detail with respect to FIG. 13.

According to one illustrative embodiment, the magnetic field caused by the magnetic properties of the platform 1402 is given by its components along the radial r direction and $\theta$ directions, as shown in the diagram 1400. In equations 1-4 (below), r is the distance from the center 1406 of the magnetic dipole of the platform 1402 to the magnetic sensor 1404, and $\theta$ is the angle of tilt between the z-axis of the platform 1402 and the position of the magnetic sensor 1404.

$$B_\theta = \frac{\mu_0}{4\pi} \frac{m}{r^3} \sin(\theta) \qquad \text{Equation 1:}$$

$$B_r = \frac{\mu_0}{4\pi} \frac{2m}{r^3} \cos(\theta) \qquad \text{Equation 2:}$$

where $\theta$ is the angle of tilt of the platform 1402, r is the distance from the center of the magnetic dipole of the platform 1402 to the magnetic sensor 1404, $\mu_0$ is the permeability of free space, and m is the magnetic dipole magnet contained in the platform 1402.

According to another illustrative embodiment, a three-axis magnetic sensor 1404 is used to measure rotation angle, without using the normalization constants $B_{X0}$ or $B_{Y0}$ as shown in equations 3-4.

$$\theta_Y = \sin^{-1}\left(\frac{B_Y}{B_{Y0}}\right) = \tan^{-1}\left(\frac{2B_Y}{B_Z}\right) \qquad \text{Equation 3:}$$

$$\theta_X = \sin^{-1}\left(\frac{B_X}{B_{X0}}\right) = \tan^{-1}\left(\frac{2B_X}{B_Z}\right) \qquad \text{Equation 4:}$$

where $\theta_x$ and $\theta_y$ are the tilts of the platform 1402 on the x- and y-axes, respectively, $B_x$, $B_y$, and $B_z$ are magnetic field components at sensor 1404 along the x-, y-, and z-axes, respectively, and $B_{X0}$ or $B_{Y0}$ are normalization constants, which represent the magnetic fields at 90 degree rotation.

Figure 13:
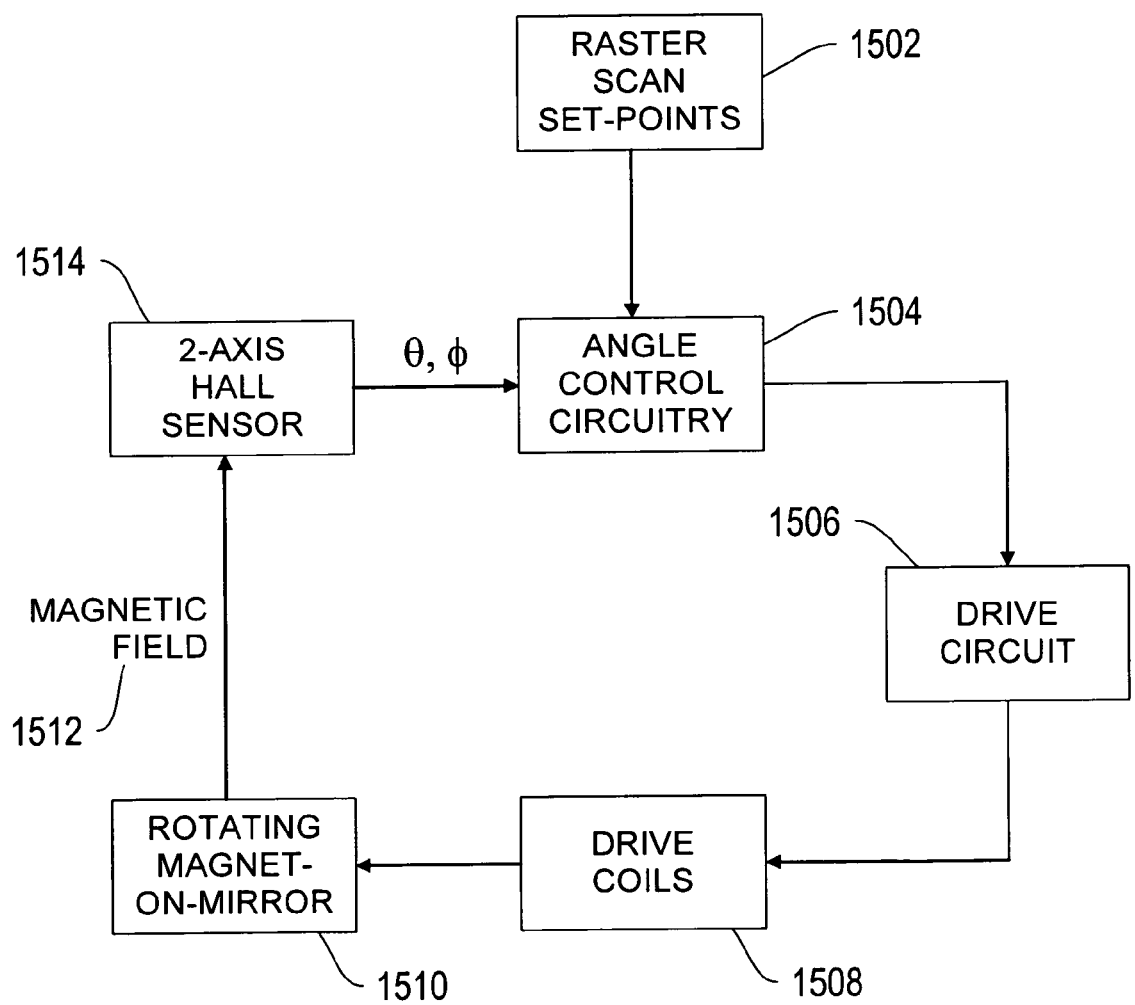
FIG. 13 is a block diagram showing a control system for controlling platform position and employing a platform sensing arrangement of the type depicted in FIG. 12.

FIG. 13 is a flow diagram 1500 illustrating a process used by a control system for controlling platform position and employing a platform sensing arrangement of the type depicted in FIG. 13. The method begins with set-points, or target points for the raster scan (step 1502). The set-points are sent to angle control circuitry which controls the angle of the platform (step 1504). The angle control circuitry sends information on the desired tilt of the platform to the drive circuit (step 1506). The drive circuit sends this information on to the drive coils (step 1508), which adjust the magnetic field, causing the platform to rotate (step 1510). A magnetic sensor senses the resulting magnetic field created by the platform, and determines actual platform tilt (step 1514). This information is sent back to the angle control circuitry, which can then readjust platform tilt as necessary.

What is claimed is:

1. A miniature actuatable platform system comprising,
   a gimbal having first, second and third toroidal gimbal plates, the first gimbal plate being a radially innermost plate, the third gimbal plate being a radially outermost gimbal plate, and the second gimbal plate being located radially intermediate to the first and third plates,
   a first pair of rotational flexures extending between the first and second gimbal plates along a first axis,
   a second pair of rotational flexures extending between the second and third gimbal plates along a second axis,
   a support assembly for mechanically coupling with the first gimbal plate for supporting the gimbal,
   a magnet mounted on the gimbal, and
   a platform mounted on the magnet.

2. The system of claim 1, wherein the first, second and third gimbal plates, and the first and second flexure pairs are formed monolithically.

3. The system of claim 1, wherein the magnet extends around at least a portion of a periphery of the gimbal.

4. The system of claim 1 comprising a reflector on a surface of the platform.

5. The system of claim 1 comprising at least one coil for generating a magnetic field in response to a drive current for attracting the magnet to tilt the platform from at least a first plane to at least a second plane.

* * * * *

UNITED STATES PATENT AND TRADEMARK OFFICE
CERTIFICATE OF CORRECTION

PATENT NO. : 7,643,196 B2
APPLICATION NO. : 11/305053
DATED : January 5, 2010
INVENTOR(S) : Bernstein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Sixteenth Day of November, 2010

David J. Kappos
*Director of the United States Patent and Trademark Office*